United States Patent
Bowen et al.

(10) Patent No.: US 9,971,891 B2
(45) Date of Patent: May 15, 2018

(54) METHODS, SYSTEMS, AND MEDIA FOR DETECTING COVERT MALWARE

(71) Applicant: The Trustees of Columbia University in the City of New York, New York, NY (US)

(72) Inventors: Brian M. Bowen, New York, NY (US); Pratap V. Prabhu, New York, NY (US); Vasileios P. Kemerlis, New York, NY (US); Stylianos Sidiroglou, Astoria, NY (US); Salvatore J. Stolfo, Ridgewood, NJ (US); Angelos D. Keromytis, New York, NY (US)

(73) Assignee: The Trustees of Columbia University in the City of the New York, New York, NY (US)

( * ) Notice: Subject to any disclaimer, the term of this patent is extended or adjusted under 35 U.S.C. 154(b) by 0 days. days.

(21) Appl. No.: 13/965,619

(22) Filed: Aug. 13, 2013

(65) Prior Publication Data
US 2013/0333037 A1    Dec. 12, 2013

Related U.S. Application Data

(63) Continuation of application No. 12/982,984, filed on Dec. 31, 2010, now Pat. No. 8,528,091.
(Continued)

(51) Int. Cl.
G06F 11/00 (2006.01)
G06F 21/56 (2013.01)
(Continued)

(52) U.S. Cl.
CPC ............ *G06F 21/56* (2013.01); *G06F 21/566* (2013.01); *G06F 21/577* (2013.01); *H04L 63/1441* (2013.01); *H04L 63/1491* (2013.01)

(58) Field of Classification Search
CPC ...... G06F 21/56; G06F 21/566; G06F 21/577; H04L 63/1441; H04L 63/1491
(Continued)

(56) References Cited

U.S. PATENT DOCUMENTS 5,440,723 A    8/1995   Arnold et al.
5,621,889 A    4/1997   Lermuzeaux et al.
(Continued)

FOREIGN PATENT DOCUMENTS

WO   WO/2008/041915   4/2008
WO   WO/2008/133762   11/2008
WO   WO/2009/032379   12/2009

OTHER PUBLICATIONS

Abou-Assaleh, T., et al., "Detection of New Malicious Code Using N-grams Signatures", In Proceedings of Second Annual Conference on Privacy, Security and Trust (PST '04), Fredericton, NB, CA, Oct. 13-15, 2004, pp. 193-196.
(Continued)

*Primary Examiner* — Techane Gergiso
(74) *Attorney, Agent, or Firm* — Byrne Poh LLP

(57) ABSTRACT

Methods, systems, and media for detecting covert malware are provided. In accordance with some embodiments, a method for detecting covert malware in a computing environment is provided, the method comprising: receiving a first set of user actions; generating a second set of user actions based on the first set of user actions and a model of user activity; conveying the second set of user actions to an application inside the computing environment; determining whether state information of the application matches an expected state after the second set of user actions is conveyed to the application; and determining whether covert malware is present in the computing environment based at least in part on the determination.

23 Claims, 9 Drawing Sheets

Related U.S. Application Data

(60) Provisional application No. 61/291,712, filed on Dec. 31, 2009.

(51) Int. Cl.
 G06F 21/57 (2013.01)
 H04L 29/06 (2006.01)

(58) Field of Classification Search
 USPC .......................................................... 726/23
 See application file for complete search history.

(56) References Cited

U.S. PATENT DOCUMENTS

| | | | |
|---|---|---|---|
| 5,796,952 A | 8/1998 | Davis et al. | |
| 5,987,611 A | 11/1999 | Freund | |
| 5,991,714 A | 11/1999 | Shanner | |
| 6,108,799 A * | 8/2000 | Boulay | G06F 21/564 714/26 |
| 6,405,318 B1 | 6/2002 | Rowland | |
| 6,408,391 B1 | 6/2002 | Huff et al. | |
| 6,671,811 B1 * | 12/2003 | Diep | G06F 21/552 709/223 |
| 6,687,833 B1 | 2/2004 | Osborne et al. | |
| 6,963,983 B2 | 11/2005 | Munson et al. | |
| 6,981,279 B1 * | 12/2005 | Arnold | G06F 21/566 703/27 |
| 7,069,316 B1 * | 6/2006 | Gryaznov | H04L 63/1433 709/224 |
| 7,093,291 B2 | 8/2006 | Bailey | |
| 7,152,242 B2 | 12/2006 | Douglas | |
| 7,155,509 B1 | 12/2006 | Cordsmeyer et al. | |
| 7,355,600 B2 | 4/2008 | Baraff et al. | |
| 7,356,844 B2 | 4/2008 | Lyle et al. | |
| 7,424,735 B2 | 9/2008 | Sorkin et al. | |
| 7,428,484 B2 | 9/2008 | Yun et al. | |
| 7,463,265 B2 | 12/2008 | Styles | |
| 7,464,407 B2 | 12/2008 | Nakae et al. | |
| 7,464,408 B1 | 12/2008 | Shah et al. | |
| 7,475,405 B2 | 1/2009 | Manganaris et al. | |
| 7,545,379 B2 | 6/2009 | Xie et al. | |
| 7,603,709 B2 | 10/2009 | Lewis et al. | |
| 7,636,944 B2 | 12/2009 | Raikar | |
| 7,673,147 B2 | 3/2010 | Moghe et al. | |
| 7,716,181 B2 | 5/2010 | Todd | |
| 7,788,071 B2 | 8/2010 | Bond et al. | |
| 7,908,652 B1 | 3/2011 | Austin et al. | |
| 7,984,100 B1 | 7/2011 | King et al. | |
| 8,015,284 B1 * | 9/2011 | Isenberg | G06F 21/51 709/224 |
| 8,122,505 B2 | 2/2012 | Verma | |
| 8,296,848 B1 * | 10/2012 | Griffin | G06F 21/52 715/201 |
| 8,429,746 B2 * | 4/2013 | Capalik | H04L 63/1441 380/201 |
| 8,458,797 B1 | 6/2013 | Yu et al. | |
| 8,479,288 B2 * | 7/2013 | Martin | G06F 21/74 380/250 |
| 8,776,168 B1 | 7/2014 | Gibson et al. | |
| 9,009,834 B1 * | 4/2015 | Ren | G06F 21/10 709/224 |
| 9,117,078 B1 * | 8/2015 | Chien | G06F 21/566 |
| 2002/0035696 A1 | 3/2002 | Thacker | |
| 2002/0066034 A1 * | 5/2002 | Schlossberg | G06F 21/552 726/23 |
| 2002/0116635 A1 | 8/2002 | Sheymov | |
| 2002/0184528 A1 * | 12/2002 | Shevenell | H04L 63/1416 726/6 |
| 2002/0197978 A1 | 12/2002 | Zavidniak | |
| 2003/0065948 A1 * | 4/2003 | Wilkes | G06F 21/55 726/4 |
| 2003/0195852 A1 | 10/2003 | Campbell et al. | |
| 2003/0219008 A1 | 11/2003 | Hrastar | |
| 2004/0049693 A1 * | 3/2004 | Douglas | H04L 63/1408 726/23 |
| 2004/0111632 A1 | 6/2004 | Halperin | |
| 2004/0148521 A1 | 7/2004 | Cohen et al. | |
| 2004/0162781 A1 | 8/2004 | Searl | |
| 2004/0172557 A1 * | 9/2004 | Nakae | H04L 63/0227 726/22 |
| 2004/0260733 A1 | 12/2004 | Adelstein et al. | |
| 2005/0071643 A1 | 3/2005 | Moghe et al. | |
| 2005/0114363 A1 | 5/2005 | Borthakur et al. | |
| 2005/0166072 A1 * | 7/2005 | Converse | H04L 63/1441 726/5 |
| 2005/0172115 A1 | 8/2005 | Bodorin et al. | |
| 2005/0188272 A1 | 8/2005 | Bodorin et al. | |
| 2005/0265331 A1 | 12/2005 | Stolfo et al. | |
| 2005/0281291 A1 | 12/2005 | Stolfo et al. | |
| 2006/0015630 A1 | 1/2006 | Stolfo et al. | |
| 2006/0085854 A1 | 4/2006 | Agrawal et al. | |
| 2006/0123083 A1 | 6/2006 | Goutte et al. | |
| 2006/0242694 A1 | 10/2006 | Gold et al. | |
| 2006/0253578 A1 * | 11/2006 | Dixon | G06Q 10/06 709/225 |
| 2006/0265750 A1 | 11/2006 | Huddleston | |
| 2007/0101430 A1 * | 5/2007 | Raikar | H04L 51/12 726/24 |
| 2007/0157289 A1 | 7/2007 | Newton et al. | |
| 2007/0162548 A1 | 7/2007 | Bilkhu et al. | |
| 2007/0240207 A1 | 10/2007 | Belakhdar et al. | |
| 2007/0250930 A1 * | 10/2007 | Aziz et al. | 726/24 |
| 2007/0271614 A1 | 11/2007 | Capalik | |
| 2007/0283434 A1 | 12/2007 | Cohen et al. | |
| 2007/0283435 A1 | 12/2007 | Cohen et al. | |
| 2007/0289018 A1 * | 12/2007 | Steeves | G06F 21/56 726/24 |
| 2007/0291043 A1 | 12/2007 | Bruderlin et al. | |
| 2008/0022400 A1 | 1/2008 | Cohen et al. | |
| 2008/0047009 A1 | 2/2008 | Overcash et al. | |
| 2008/0235299 A1 * | 9/2008 | Haselton | G06F 11/1451 |
| 2009/0007270 A1 | 1/2009 | Futoransky et al. | |
| 2009/0028135 A1 | 1/2009 | Mantripragada et al. | |
| 2009/0044042 A1 | 2/2009 | Fujiwara et al. | |
| 2009/0083855 A1 | 3/2009 | Apap et al. | |
| 2009/0144823 A1 * | 6/2009 | Lamastra | H04L 51/12 726/22 |
| 2009/0222920 A1 * | 9/2009 | Chow | G06F 21/566 726/23 |
| 2009/0227281 A1 * | 9/2009 | Hammad et al. | 455/550.1 |
| 2009/0292696 A1 * | 11/2009 | Shuster | 707/5 |
| 2009/0293121 A1 | 11/2009 | Bigus et al. | |
| 2009/0328216 A1 * | 12/2009 | Rafalovich | H04L 43/0876 726/23 |
| 2010/0046790 A1 * | 2/2010 | Koziol | G06F 21/36 382/100 |
| 2010/0064370 A1 * | 3/2010 | Thiebeauld de la Crouee et al. | 726/24 |
| 2010/0077483 A1 * | 3/2010 | Stolfo et al. | 726/24 |
| 2010/0132038 A1 * | 5/2010 | Zaitsev | G06F 21/552 726/22 |
| 2010/0269175 A1 * | 10/2010 | Stolfo | G06F 21/55 726/22 |
| 2011/0010470 A1 | 1/2011 | Hulbert et al. | |
| 2011/0093630 A1 | 4/2011 | Arnholt, Jr. et al. | |
| 2011/0167493 A1 | 7/2011 | Song et al. | |
| 2012/0084866 A1 | 4/2012 | Stolfo | |

OTHER PUBLICATIONS

Abou-Assaleh, T., et al., "N-Gram-Based Detection of New Malicious Code", In Proceedings of the 28th International Computer Software and Applications Conference (COMPSAC '04), Hong Kong, Sep. 28-30, 2004, pp. 41-42.

Aha, D.W., et al., "Instance-Based Learning Algorithms", In Machine Learning, vol. 6, No. 1, Jan. 1991, pp. 37-66.

Akritidis, P., et al., "Proximity Breeds Danger: Emerging Threats in Metro-Area Wireless Networks", In Proceedings of the 16th USENIX Security Symposium, Boston, MA, USA, Aug. 6-10, 2007, pp. 323-338.

(56) References Cited

OTHER PUBLICATIONS

Arbaugh, W.A., "Chaining Layered Integrity Checks", PhD Thesis, University of Pennsylvania. 1999 (month unknown), pp. 1-118.

Arbaugh, W.A., et al., "A Secure and Reliable Bootstrap Architecture". In IEEE Security and Privacy Conference, May 1997, pp. 65-71.

Attenberg, J., et al., "Modeling and Predicting User Behavior in Sponsored Search", In Proceedings of the 15th ACM SIGKDD International Conference on Knowledge Discovery and Data Mining (KDD '09). Paris, FR, Jun. 28-Jul. 1, 2009, pp. 1067-1076.

Baeza-Yates, R., et al., "Modeling user Search Behavior", In Proceedings of the 3rd Latin American Web Congress (LA-WEB '05), Buenos Aires, AR, Oct. 31-Nov. 2, 2005, pp. 242-251.

Bailey, M., et al., "The Blaster Worm: Then and Now", In IEEE Security & Privacy, vol. 3, No. 4, Jul./Aug. 2005, pp. 26-31.

Balajinath, B. and Raghavan, S.V., "Intrusion Detection Through Learning Behavior Model", In Computer Communications, vol. 24, No. 12, Jul. 2001, pp. 1202-1212.

Barham, P., et at., "Xen and the Art of Virtualization", In Proceedings of the Nineteenth ACM Symposium on Operating Systems Principles (SOSP '03), vol. 37, No. 5, Bolton Landing. NY, USA, Oct. 19-22, 2003, pp. 164-177.

Beck, M. and Tews, E., "Practical Attacks Against WEP and WPA", In Proceedings of the 2nd ACM Conference on Wireless Network Security (WiSec '09), Zurich, CH, Mar. 16-18, 2009, pp, 79-85.

Bell, D.E., and LaPadula, L.J., "Secure Computer Systems: Mathematical Foundations and Model", Technical Report ESD-TR-74-244, Mitre Corp, Bedford, MA, USA, Nov. 1973, pp. 1-33.

Bellard, F.. "QEMU, a Fast and Portable Dynamic Translator", In Proceedings of USENIX Annual Technical Conference, Anaheim, CA, USA, Apr. 10-15, 2005, pp. 41-46.

Bittau, A., et al., "The Final Nail in WEP's Coffin", In Proceedings of the 2006 IEEE Symposium on Security and Privacy (S&P '06), Berkeley, CA, USA, May 21-24, 2006, pp. 386-400.

Bloom, B.H., "Space/Time Trade-Offs in Hash Coding with Allowable Errors". In Communications of the ACM, vol. 13, No. 7, Jul. 1970, pp. 422-426.

Bond, M. and Danezis, G., "A Pact with the Devil". In Proceedings of the New Security Paradigms Workshop (NSPW '06), Schloss Dagstuhl, DE, Sep. 19-22, 2006, pp. 77-83.

Borders, K., et al., "Siren: Catching Evasive Malware", In Proceedings of the IEEE Symposium on Security and Privacy (S&P '06), Oakland, CA, USA, May 21-24, 2006, pp. 76-85.

Bowen, B.M., et al.. "Automating the Injection of Believable Decoys to Detect Snooping", In Proceedings of the 3rd ACM Conference on Wireless Network Security (WiSec '10), Hoboken, NJ, USA, Mar. 22-24, 2010, pp. 81-86.

Bowen, B.M., et al., "Baiting Inside Attackers Using Decoy Documents", In Proceedings of the 5th International ICST Conference on Security and Privacy in Communication Networks (SecureComm '09), Athens, GR, Sep. 14-18, 2009, pp. 51-70.

Bowen, B.M., et al., "Designing Host and Network Sensors to Mitigate the Insider Threat", In IEEE Security & Privacy Magazine. vol. 7, No. 6, Nov./Dec. 2009, pp. 22-29.

Butler, J. and Sparks, S., "Spyware and Rootkits: The Future Convergence", In Login, vol. 29, No. 6, Dec. 2004, pp. 8-15.

CERT, "'Code Red' Worm Exploiting Buffer Overflow in IIS Indexing Service DLL", Technical Report, CERT Advisory CA-2001-19, Jul. 19, 2001, pp. 1-3, available at: http://www.cert.org/advisories/CA-2001-19.html.

CERT, "MS-SQL Server Worm", Technical Report, CERT Advisory CA-2003-04, Jan. 27, 2003, pp. 1-3, avaitable at: http://www.cert.org/advisories/CA-2003-04.html.

CERT, "Nimda Worm", Technical Report, CERT Advisory CA-2001-26, Sep. 18, 2001, pp. 1-5, available at: http://www.cert.org/advisories/CA-2001-26.html.

CERT, "W32/Blaster Worm", Technical Report, CERT Advisory CA-2003-20, Aug. 14, 2003, pp. 1-3, available at: http://www.cert.org/advisories/CA-2003-20.html.

Chandrasekaran, M., et al., "SpyCon: Emulating User Activities to Detect Evasive Spyware", In Proceedings of the Performance, Computing, and Communications Conference (IPCCC '07), New Orleans, LA, USA, Apr. 11-13, 2007, pp. 502-509.

Chang, C.C. and Lin, C.J., "LIBSVM: A Library for Support Vector Machines", Technical Report, Jan. 2008, pp. 1-39, available at: http://www.csie.ntu.tv/cjlin/libsvm.pdf.

Chen, P.M. and Noble, B.D., "When Virtual is Better Than Real", In Proceedings of the 8th Workshop on Hot Topics in Operating System (HotOS '01), Elmau/Oberbayern, DE, May 20-23, 2001, pp. 133-138.

Cheswick, B., "An Evening with Berferd in Which a Cracker is Lured, Endured, and Studied", AT&T Bell Laboratories, Jan. 7, 1991, pp. 1-11, available at: www.cheswick.com/ches/papers/berferd.pdf.

Chinchani, R., et al., "RACOON: Rapidly Generating User Command Data for Anomaly Detection from Customizable Templates", In Proceedings of the 20th Annual Computer Security Applications Conference (ACSAC '04), Tucson, AZ, USA, Dec. 6-10, 2004, pp. 189-204.

Chou, N., et al., "Client-Side Defense Against Web-Based Identity Theft", In Proceedings of the ISOC Symposium on Network end Distributed Systems Security (NDSS '04), San Diego, CA, USA, Feb. 5-6, 2004. pp. 1-16.

Christodorescu, M. and Jha, S., "Static Analysis of Executables to Detect Malicious Patterns", In Proceedings of the 12th USENIX Security Symposium (SSYM '03), Washington, DC, USA, Aug. 4-8, 2003, pp. 169-186.

Christodorescu, M. and Jha, S., "Testing Malware Detectors", In Proceedings of the ACM SIGSOFT International Symposium on Software Testing and Analysis (ISSTA '04), Boston, MA, USA, Jul. 11-14, 2004, pp. 34-44.

Clark, D.D. and Wilson, D.R., "A Comparison of Commercial and Military Computer Security Policies", In Proceedings of the IEEE Symposium on Security and Privacy (S&P '87), Oakland, CA, USA, Apr. 27-29, 1987, pp. 184-194.

Costa, P.C.G., et al., "DTB Project: A Behavioral Model for Detecting Insider Threats", In Proceedings of the International Conference on Intelligence Analysis, McLean, VA, USA, May 2-6, 2005, pp. 1-6.

Coull, S., et al., "Intrusion Detection: A Bioinformatics Approach", In Proceedings of the 19th Annual Computer Security Applications Conference (ACSAC '03), Las Vegas, NV, US, Dec. 8-12, 2003. pp. 24-33.

Coull, S.E. and Szymanski, B.K., "Sequence Alignment for Masquerade Detection". In Computational Statistics & Data Analysis, vol. 52, No. 6, Apr. 15, 2006, pp. 4116-4131.

Cover, T.M. and Hart, P.E., "Nearest Neighbor Pattern Classification", In IEEE Transactions on Information Theory, vol. 13, No. 1, Jan. 1967, pp. 21-27.

Cracknell, P., et al., "The Wireless Security Survey of New York City", Technical Report, RSA, The Security Division of EMC, Oct. 2008, pp. 1-9.

Cui, W., et al., "Protocol-Independent Adaptive Replay of Application Dialog", In Proceedings of the 13th Symposium on Network and Distributed System Security (NDSS '06), San Diego, CA, USA, Feb. 2-3, 2006, pp. 1-15.

Cully, B., et al., "Remus: High Availability via Asynchronous Virtual Machine Replication". In Proceedings of the USENIX Symposium on Networked Systems Design and Implementation (NSDI '08), San Francisco, CA, USA, Apr. 16-18, 2008, pp. 161-174.

Dagon, D., et al., "HoneyStat: Local Worm Detection Using Honeypots", In Proceedings of the 7th International Symposium on Recent Advances in Intrusion Detection (RAID '04), Sophia Antipolis, FR, Sep. 15-17, 2004, pp. 39-58.

Damashek. M., "Gauging Similarity with N-Grams: Language-Independent Categorization of Text", In Science, vol. 267, No. 5199, Feb. 10, 1995, pp. 843-848.

Dark Reading, "Researcher Uncovers Massive, Sophisticated Trojan Targeting Top Businesses", Darkreading, Jul. 29, 2009, pp. 1-2, available at: http://www.darkreading.com/database_security/security/privacy/showArticle.jhtml?articleID=218800077.

(56) References Cited

OTHER PUBLICATIONS

Dash, S.K., et al., "Masquerade Detection Using IA Network", In Proceedings of the 1st International Workshop on Applications of Constraint Satisfaction and Programming to Computer Security Problems (CPSec '05), Sitges, ES, Oct. 1, 2005, pp. 18-30.

Davison, B.D. and Hirsh, H., "Predicting Sequences of User Actions", In Proceedings of the Workshop on Predicting the Future: AI Approaches to Time-Series Problems, Madison, WI, US, Jul. 27, 1998, pp. 5-12.

Davison, B.D. and Hirsh, H., "Toward an Adaptive Command Line Interface", In Proceedings of the Seventh International Conference on Human-Computer Interaction (HCI '97), San Francisco, CA, US, Aug. 24-29, 1997, pp. 505-508.

De Maesschalck, R., et al., "The Mahalanobis Distance", In Chemometrics and Intelligent Laboratory Systems, vol, 50, No. 1, Jan. 4, 2000, pp. 1-18.

Demers, A., et al., "Cayuga: A General Purpose Event Monitoring System", In Proceedings of the Third Biennial Conference on Innovative Data Systems Research (CIDR '07), Asilomar, CA, USA, Jan. 7-10, 2007, pp. 412-422.

Detristan, T., et al., "Polymorphic Shellcode Engine Using Spectrum Analysis", In Phrack, vol. 61, Aug. 13, 2003, pp. 1-25, available at: http://www.phrack.org/issues.html?issue=61&id=9.

Dhamija, R., et al., "Why Phisning Works", In Proceedings of the 2006 Conference on Human Factors in Computing Systems (CHI '06), Montréal, QC, CA, Apr. 22-27, 2006, pp. 581-590.

Dovrolis, C., et al., "Packet-Dispersion Techniques and a Capacity-Estimation Methodology", In IEEE/ACM Transactions on Networking, vol. 12, No. 6, Dec. 2004, pp. 963-977.

Dubendorfer, T., et al., "Flow-Level Traffic Analysis of the Blaster and Sobig Worm Outbreaks in an Internet Backbone", In Proceedings of the Conference on Detection of Intrusions and Malware & Vulnerability Assessment (DIMVA '05), Vienna, AT, Jul. 7-6, 2005, pp. 103-122.

DuMouchel, W., "Computer intrusion Detection Based on Bayes Factors for Comparing Command Transition Probabilities", Technical Report TR91, National Institute of Statistical Sciences, Feb. 1999, pp. 1-14.

Egele, M., et al., "Dynamic Spyware Analysis", In Proceedings of the USENIX Annual Technical Conference, Santa Clara, CA, USA, Jun. 17-22, 2007, pp. 233-246.

Forrest, S., et al., "A Sense of Self for Unix Processes", In Proceedings of the IEEE Symposium on Security and Privacy, Oakland, CA, US, May 6-8, 1996, pp. 120-128.

Frias-Martinez, V., et al., "Behavior-Based Network Access Control: A Proof-of-Concept", In the Proceedings of the 11th Information Security Conference (ISC '08), Taipei, TW, Sep. 15-18, 2008, pp, 175-190.

Friess, N. and Aycock, J., "Black Market Botnets", Technical Report TR 2007-873-25, University of Calgary, Jul. 2007, pp. 1-14.

Garfinkel, T. and Rosenblum, M., "A Virtual Machine Introspection Based Architecture for Intrusion Detection", In Proceedings of the 10th Network and Distributed System Security Symposium (NDSS '03), San Diego, CA, USA, Feb. 6-7, 2003, pp. 191-206.

Garfinkel, T., et al., "Compatibility is Not Transparency: VMM Detection Myths end Realities", In Proceedings of the 11th USENIX Workshop on Hot Topics in Operating Systems (HotOS '07), San Diego, CA, USA, May 7-9, 2007, pp. 1-6.

Gartner, "Gartner Survey Shows Phishing Attacks Escalated in 2007; More than $3 Billion Lost to These Attacks", Dec. 17, 2009, pp. 1-3, available at: http://www.gartner.com/it/page.jsp?id=565125.

Ghost, A.K., et al. "Learning Program Behavior Profiles for Intrusion Detection", In Proceedings of the Workshop on Intrusion Detection and Network Monitoring, Santa Clara, CA, US, Apr. 9-12, 1999, pp. 51-62.

Goel, S. and Bush, S.F., "Kolmogorov Complexity Estimates for Detedion of Viruses in Biologically Inspired Security Systems: A Comparison with Traditional Approaches", In Complexity Journal, vol, 9, No. 2, Nov.-Dec. 2003, pp. 54-73.

Goldring, T., "User Profiling for Intrusion Detection in Windows NT", In Proceedings of the 35th Symposium on the Interface: Computing Science and Statistics, Salt Lake City, UT, USA, Mar. 12-15, 2003, pp. 524-527.

Gordon, L.A., et al., "CSI/FBI Computer Crime and Security Survey", Computer Security Institute, Jul. 2006, pp. 1-27, available at: http://gosci.com/SurveyArchive.

Graham, R.D., "SideJacking with Hamster", Technical Report, Errata Security, Aug. 5, 2007. pp. 1-11, available at: http://erratasec.blogspot.com/2007/08/sidejacking-with-hamster_05.html.

Hall, M., et al., "The WEKA Data Mining Software: An Update", In ACM SIGKDD Explorations Newsletter, vol. 11, No. 1, Jun. 2009, pp. 10-18.

Harmon, D., et al., "Robust Treatment of Simultaneous Collisions", In SIGGRAPH ACM Transactions on Graphics, vol. 27, No. 3, Aug. 2008, pp. 1-4.

Higgins, K.J., "Up to 9 Percent of Machines in an Enterprise are Bot-Infected", Darkreading, Sep. 24, 2009, pp. 1-2, available at: http://www.darkreading.com/insiderthreat/security/client/showArticle.jhtml?articleID=220200118.

Hirschberg, D.S., "A Linear Space Algorithm for Computing Maximal Common Subsequences", In Communications of the ACM, vol. 18, No. 6, Jun. 1975, pp. 341-343.

Hoang, M., "Handing Today's Tough Security Threats", In Symantec Official Blog, Nov. 2, 2006, pp. 1-2, available at: http://www.symantec.com/connect/blogs/handling-todays-tough-security-threats-rootkits.

Holz, T., "A Short Visit to the Bot Zoo", In IEEE Security & Privacy, vol. 3, No. 3, May/Jun. 2005, pp. 76-79.

Holz, T., et al., "Learning More About the Underground Economy: A Case-Study of Keyloggers and Dropzones", In Proceedings of the 14th European Symposium on Research in Computer Security (ESORICS '09), Saint-Malo, FR, Sep. 21-23, 2009, pp. 1-18.

Hong, S.S. and Wu, S.F., "On Interactive Internet Traffic Replay", In Proceedings of the 8th International Symposium on Recent Advances in Intrusion Detection (RAID '05), Seattle, WA, USA, Sep. 7-9, 2005, pp. 247-264.

Ilett, D., "Trojan Attacks Microsoft's Anti-Spyware", CNET News, Feb. 9, 2005, pp. 1-3, available at: http://news.cnet.com/Trojan-attacks-Microsofts-anti-spyware/2100-7349_3-5569429.html.

International Patent Application No. PCT/US2007/012811, filed May 31, 2007.

International Patent Application No. PCT/US2008/066623, filed Jun. 23, 2008.

International Preliminary Report on Patentability in International Patent Application No. PCT/US2007/012811, filed May 31, 2007, issued Dec. 3, 2008.

International Preliminary Report on Patentability in International Patent Application No. PCT/US2008/066623, filed Jun. 12, 2008, mailed Dec. 30, 2009.

International Search Report in International Patent Application No. PCT/US2007/012811, filed May 31, 2007, mailed Jul. 17, 2008.

International Search Report in International Patent Application No. PCT/US2008/066623, filed Jun. 12, 2008, mailed Feb. 13, 2009.

Jagatic, T., et al., "Social Phishing", Technical Report, Indiana University, Dec. 12, 2005, pp. 1-10.

Jha, S., et al., "A Filtering Approach to Anomaly and Masquerade Detection", Technical Report, University of Wisconsin, 2004, pp. 1-21.

Jiang, X. and Wang, X., "'Out-of-the-Box' Monitoring of VM-Based High-Interaction Honeypots", In Proceedings of the 10th International Symposium on Recent Advances in Intrusion Detection (RAID '07), Gold Coast, AU, Sep. 5-7, 2007, pp. 198-218.

Jones, A.K. and Sielken, R.S., "Computer System Intrusion Detection: A Survey", Technical Report, University of Virginia, Feb. 9. 2000, pp. 1-25.

Jones, S.T., et al., "Antfarm: Tracking Processes in a Virtual Machine Environment", In Proceedings of the USENIX Annual Technical Conference, Boston, MA, USA, May 30-Jun. 3, 2006, pp. 1-14.

Ju, W.H. and Vardi, Y., "A Hybrid High-Order Markov Chain Model for Computer Intrusion Detection", Technical Report No. 92, National Institute of Statistical Sciences, Feb. 1999, pp. 1-24.

(56) References Cited

OTHER PUBLICATIONS

Karim, M.E., et al., "Matware Phylogeny Generation using Permutations of Code", In Journal in Computer Virology, vol. 1, No. 1-2, Nov. 2005, pp. 13-23.
Killourhy, K. and Maxion, R.A., "Investigating a Possible Flaw in a Masquerade Detection System", Technical Report CS-TR-896, Newcastle University, Nov. 2004, pp. 1-11.
Killourhy, K.S. and Maxion, R.A., "Comparing Anomaly-Detection Algorithms for Keystroke Dynamics", In IEEE/IFIP International Conference on Dependable Systems & Networks (DSN '09), Jun. 29-Jul. 2, 2009, pp. 125-134.
Klimt B. and Yang, Y., "Introducing the Enron Corpus", In Proceedings of the 3rd Conference on Email and Anti-Spam (CEAS '06), Mountain View, CA, USA, Jul. 27-28, 2006, pp. 1-2.
Kolesnikov, O., et al., "Advanced Polymorphic Worms: Evading IDS by Blending in with Normal Traffic", Technical Report GIT-CC-04-15, Georgia Institute of Technology, 2004, pp. 1-22.
Kravets, D., "From Riches to Prison: Hackers Rig Stock Prices", Wired Blog Network, Sep. 8, 2008, pp. 1-6, available at: www.wired.com/threatlevel/2008/09/from-riches-to/.
Krebs, B., "Web Fraud 2.0: Validating Your Stolen Goods", The Washington Post, Aug. 20, 2008, pp. 1-5, available at: http://voices.washingtonpost.com/securityfix/2008/08/web_fraud_20_try_before_you_bu.html.
Lane, T. and Brodley, C.E., "Sequence Matching and Learning in Anomaly Detection for Computer Security", In Proceedings of the Workshop on AI Approaches to Fraud Detection and Risk Management (AAAI-97), Jul. 27-31, 1997, pp. 43-49.
Laskey, K., et al., "Detecting Threatening Behavior Using Bayesian Networks", In Proceedings of the 13th Conference on Behavior Representation in Modeling and Simulation (BRIMS '04), Arlington. VA, USA, May 17-20, 2004, pp. 136-146.
Lee, W. and Xiang, D., "Information-Theoretic Measures for Anomaly Detection", In Proceedings of the IEEE Symposium on In Security and Privacy (S&P'01), Oakland, CA, USA, May 14-16, 2001, pp. 130-143.
Li, L. and Manikopoulos C.N., "Windows NT One-Class Masquerade Detection", In Proceedings of the 5th Annual IEEE Workshop on Information Assurance, West Point, NY, USA, Jun. 10-11, 2004, pp. 82-87.
Li, M., et al., "WBest: a Bandwidth Estimation Tool for IEEE 802.11 Wireless Networks", In Proceedings of the 33rd IEEE Conference on Local Computer Networks (LCN '08), Montreal, QC, CA, Oct. 14-17, 2008, pp. 374-381.
Li, W.J., et al., "A Study of Malcode-Bearing Documents", In Proceedings of the 4th International Conference on Detection of Intrusions and Malware, and Vulnerability Assessment (DIMVA '07), Lucerne, CH, Jul. 12-13, 2007, pp. 231-250.
Li, W.J., et al., "Fileprints: Identifying File Types by N-Gram Analysis", In Proceedings of the 6th Annual IEEE SMC Information Assurance Workshop (IAW '05), West Point, NY, USA, Jun. 15-17, 2005, pp. 64-71.
Lindahl, G., "MS Outlook to Unix Mailbox Conversion Mini How-to", Jan. 8, 2004, pp. 1-8, available at: http://tldp.org/HOWTO/pdf/Outlook-to-Unix-Mailbox.pdf.
Lippmann, R.P., et al., "Evaluating Intrusion Detection Systems: The 1998 DARPA Off-Line Intrusion Detection Evaluation", In Proceedings of the DARPA Information Suivivability Conference and Exposition (DISCEX '00), vol. 2, Jan. 25-27, 2000, pp. 12-26.
Mahoney et al., "Learning Nonstationary Models of Normal Network Traffic for Detecting Novel Attacks", In Proceedings of the Eighth ACM SIGKDD International Conference on Knowledge Discovery and Data Mining (SIGKDD '02), Edmonton, Alberta, CA, Jul. 23-26, 2002, pp. 376-385.
Maloof, M.A. and Stephens, G.D., "ELICIT: A System for Detecting Insiders Who Violate Need-to-Know", In Proceedings of the 10th International Conference on Recent Advances in Intrusion Detection (RAID '07), Gold Coast, AU, Sep. 5-7, 2007, pp. 146-166.

Maxion, R.A. and Townsend T.N., "Masquerade Detection Using Truncated Command Lines", In Proceedings of the International Conference on Dependable Systems & Networks (DSN '02), Bethesda, MD, US, Jun. 23-26, 2002, pp. 219-228.
Maxion, R.A. and Townsend, T.N,, "Masquerade Detection Augmented with Error Analysis", In IEEE Transactions on Reliability, vol. 53, No. 1, Mar. 2004, pp. 124-147.
Maxion, R.A., "Masquerade Detection Using Enriched Command Lines", In Proceedings of the International Conference on Dependable Systems & Networks (DSN '03). San Francisco, CA, US. Jun. 22-25, 2003, pp. 5-14.
Maybury, M., et al., "Analysis and Detection of Malicious Insiders", In Proceedings of the International Conference on Intelligence Analysis, McLean, VA, USA, May 2-3, 2005, pp. 1-5.
McDaniel, M. and Hossain, H.M., "Content Based File Type Detection Algorithms", In Proceedings of the 36th Annual Hawaii International Conference on System Sciences (HICSS '03): Big Island, HI, USA, Jan. 6-9, 2003, pp. 1-10.
McGlasson, L., "TJX Update: Breach Worse Than Reported". Technical Report, Bank Info Security, Oct. 26, 2007, pp. 1-4, available at: http://www.bankinfosecurity.com/tjx-update-breach-worse-than-reported-a-606.
McRae, C.M. and Vaughn, R.B., "Phighting the Phisher: Using Web Bugs and Honeytokens to investigate the Source of Phishing Attacks", In Proceedings of the 40th Annual Hawaii International Conference on System Sciences (HICSS '07), Waikoloa, Big Island, HI, USA, Jan. 3-6, 2007, pp. 1-7.
Medina, A., et al., "Traffic Matrix Estimation: Existing Techniques and New Directions", In Proceedings of the ACM SIGCOMM Computer Communication Review (SIGCOMM '02). Pittsburgh, PA, USA, Aug. 19-23, 2002, pp. 161-174.
Messmer, E., "America's 10 Most Wanted Botnets", Network World, Jul. 22, 2009, pp. 1-3, available at: http://www.networkworld.com/news/2009/072209-botnets.html.
Michael J.B., et al., "Software Decoys: Intrusion Detection and Countermeasures", In Proceedings of the 2002 IEEE Workshop on Information Assurance (IAW '02), West Point, NY, USA, Jun. 17-19, 2002, pp. 130-138.
Microsoft, "Microsoft Security Advisory 912840: Vulnerability in Graphics Rendering Engine Could Allow Remote Code Execution", Technical Report, Jan. 5, 2006, pp. 1-2, available at: http://www.microsoft.com/technet/security/advisory/912840.mspx.
Monrose, F. and Rubin, A., "Authentication via Keystroke Dynamics", In Proceedings of the 4th ACM Conference on Computer and Communications Security (CCS '97), Zurich, CH, Apr. 1-4, 1997, pp. 48-56.
Montero Jr., V., "How Intrusion Detection Can Improve Software Decoy Applications", Master's Thesis, Naval Postgraduate School, Mar. 2003. pp. 1-69.
Moore, D., et al., "Code-Red: A Case Study on the Spread and Victims of an Internet Worm", In Proceedings of the 2nd Internet Measurement Workshop (IMW '02), Marseille, FR, Nov. 6-8, 2002, pp. 273-284.
Morse, A., "Google's Gmail Service Suffers Another Shutdown", Technical Report, Wall Street Journal, Mar. 11, 2009, pp. 1-4, available at: http://online.wsj.com/article/SB123673492963090721.html.
Moshchuk, A., et al., "A Crawler-Based Study of Spyware in the Web", In Proceedings of the ISOC Symposium on Network and Distributed System Security (NDSS '06), San Diego, CA, USA, Feb. 2-3, 2006, pp. 1-17.
Naor, M. and Yung, M., "Universal One-Way Hash Functions and their Cryptographic Applications", In Proceedings of the 21st Annual ACM Symposium on Theory of Computing (STOC '89), Seattle, WA, USA, May 14-17, 1989, pp. 33-43.
Nguyen, N., et al., "Detecting Insider Threats by Monitoring System Call Activity", In Proceedings of the Man and Cybernetics Society Information Assurance Workshop (IAW '03). West Point, NY, USA, Jun. 18-20, 2003, pp. 45-52.
Noga, A.J., "A Visual Data Hash Method", Technical Report, Air Force Research Laboratory, Oct. 2004, pp. 1-19.
Notice of Allowance dated Dec. 23, 2013 in U.S. Appl. No. 12/628,587.

(56) References Cited

OTHER PUBLICATIONS

Notice of Allowance dated Apr. 29, 2013 in U.S. Appl. No. 12/982,984.
O'Brien, M., and Keane, M.T., "Modeling User Behavior Using a Search Engine", In Proceedings of the 12th International Conference on Intelligent User Interfaces (IUI '07), Honolulu, HI, US, Jan. 28-31, 2007, pp. 357-360.
Office Action dated Oct. 11, 2013 in U.S. Appl. No. 12/565,394.
Office Action dated Oct. 16, 2012 in U.S. Appl. No. 12/982.984.
Office Action dated Nov. 15, 2012 in U.S. Appl. No. 12/302,774.
Office Action dated Nov. 29, 2012 in U.S. Appl. No. 12/628,587.
Office Action dated Nov. 7, 2013 in U.S. Appl. No. 12/302,774.
Office Action dated Dec. 16, 2014 in U.S. Appl. No. 13/166,723.
Office Action dated Feb. 23, 2012 in U.S. Appl. No. 12/565,394.
Offim Action dated Mar. 21, 2012 in U.S. Appl. No. 12/628,587.
Office Action dated Mar. 28, 2012 in U.S. Appl. No. 12/302,774.
Office Action dated Mar. 5, 2013 in U.S. Appl. No. 12/565,394.
Office Action dated Mar. 7, 2014 in U.S. Appl. No. 13/166,723.
Office Action dated Apr. 22, 2009 in U.S. Appl. No. 12/302,774.
Office Action dated Apr. 3, 2014 in U.S. Appl. No. 12/565,394.
Office Action dated Jul. 17, 2013 in U.S. Appl. No. 13/166,723.
Office Action dated Aug. 16, 2012 in U.S. Appl. No. 12/565,394.
Oka, M., et al., "Anomaly Detection Using Layered Networks based on Eigen Co-Occurrence Matrix", In Proceedings of the International Symposium on Recent Advances in Intrusion Detection (RAID '04). Sophia Antipolis, FR, Sep. 15-17, 2004, pp. 223-237.
Oka, M., et al., "Eigen Co-Occurrence Matrix Method for Masquerade Detection", In Proceedings of the 7th JSSST SIGSYS Workshop on Systems for Programming and Applications (SPA '04), Nagano, JP, Mar. 2004, pp. 1-7.
Oudot. L., "Wireless Honeypot Countermeasures", Technical Report. Security Focus, Feb. 13, 2004, pp. 1-23, available at: http://www.securityfocus.com/print/infocus/1761.
Packet Storm, "Antisniff", pp. 1-2, accessed May 17, 2012, available at: http://packetstormsecurity.org/sniffers/antisniff/.
Pappas, V., et al., "Crimeware Swindling Without Virtual Machines", In Proceedings of the 13th International Conference on Information Security (ISC '10), Boca Raton, FL, USA, Oct. 25-28, 2010, pp. 196-202.
Pappas, V., et al., "Evaluation of Spyware Detection System Using Thin Client Computing", In Proceedings of the 13th International Conference on Information Security and Cryptology (ICISC '10), Seoul, KR, Dec. 1-3, 2010, pp. 222-232.
Pereira, J., "How Credit-Card Data Went out Wireless Door", In Wall Street Journal, May 4, 2007, pp. 1-4, available at: http://online.wsj.com/article/SB117824446226991797.html.
Petroni, Jr., N.L., et al., "Copilot-A Coprocessor-Based Kernel Runtime Integrity Monitor", In Proceedings of the 13th USENIX Security Symposium, San Diego, CA, USA, Aug. 9-13, 2004, pp. 179-194.
Phyo, A.H. and Furnell, S.M., "A Detection-Oriented Classification of Insider IT Misuse", In Proceedings of the 3rd USENIX Security Conference, Las Vegas, NV, USA, Apr. 14-15, 2004, pp. 1-12.
Plummer, D. and Greenwood, W., "The History of Nuclear Weapon Safety Devices", In Proceedings of the 34th AIAA/ASME/SAE/ASEE Joint Propulsion Conference, Cleveland, OH, US, Jul. 13-15, 1998, pp. 1-8.
Prevelakis, V. and Spinellis, D., "The Athens Affair", In IEEE Spectrum, vol. 44, No. 7, Jul. 2007, pp. 26-33.
Provos, N., "A Virtual Honeypot Framework", In Proceedings of the 13th USENIX Security Symposium, San Diego, CA, USA, Aug. 9-13, 2004, pp. 1-14.
Provos, N., "Defeating Statistical Steganalysis" Dec. 2001, pp. 1-113, available at: http://niels.xtdnet.nl.stego/.
Randazzo, M.R., et al., "Insider Threat Study: Illicit Cyber Activity in the Banking and Finance Sector", Technical Report, Carnegie Mellon University, Jun. 2005, pp. 1-28.
Richardson, R., "CSI Computer Crime & Security Survey", 2008 (month unknown), pp, 1-30, available at: http://gocsi.com/SurveyArchive.
Rivest, R.L., "Chaffing and Winnowing: Confidentiality without Encryption", In CryptoBytes, Mar. 18, 1998, pp. 12-17.
Sailer, R., et al., "Design and Implementation of a TCG-based Integrity Measurement Architecture", In Proceedings of the 13th USENIX Security Symposium, San Diego, CA, USA, Aug. 9-13, 2004. pp. 223-238.
Salem, M.S. and Stolfo, S.J., "Masquerade Attack Detection Using a Search-Behavior Modeling Approach", Techctcal Report CUCS-027-09. Columbia University, 2009 (month unknown), pp. 1-17.
Salem, M.B. and Stolfo, S.J., "Masquerade Detection Using a Taxonomy-Based Multinomial Modeling Approach in UNIX Systems", Technical Report CUCS-021-08, Columbia University, 2008 (month unknown), pp. 1-14.
Salem, M.B., et al., "A Survey of Insider Attack Detection Research", In Insider Attack and Cyber Security: Beyond the Hacker, Springer, Apr. 2008, pp. 69-90.
Salem, M.B., et al., "Modeling User Search-Behavior for Masquerade Detection", In Proceedings of the 14th International Symposium on Recent Advances in Intrusion Detection, Menlo Park, CA, USA, Sep. 20-21, 2011, pp. 181-200.
Sanfilippo, S., "Hping—Active Network Security Tool". pp. 1-51, accessed May 18, 2012, available at: http://www.hping.org.
Saroiu, S., et al., "Measurement and Analysis of Spyware in a University Environment", In Proceedings of the 1st Symposium on Networked Systems Design and Implementation (NSDI '04), San Francisco, CA, USA, Mar. 29-31, 2004, pp. 141-153.
Scholkopf, B., et al., "Estimating the Support of a High-Dimensional Distribution", Technical Report MSR-TR-99-87, Microsoft Research, Sep. 18, 2000, pp. 1-30.
Schonlau, M., "Masquerading User Data", accessed Jun. 13, 2012, pp. 1-2, available at: http://www.schonlau.net/intrusion.html.
Schonlau, M., et al., "Computer Intrusion: Detecting Masquerades", In Statistical Science, vol. 16, No. 1, Feb. 2001, pp. 58-74.
Schultz, E.E., "A Framework for Understanding and Predicting Insider Attacks", In Journal of Computers and Security, vol. 21, No. 1, Oct. 1, 2002, pp. 526-531.
Schultz, M.G., et al., "Data Mining Methods for Detection of New Malicious Executables", In Proceedings of the IEEE Symposium on Security and Privacy (S&P '01), Oakland, CA, USA, May 14-16, 2001, pp. 38-49.
Sekar, R., et al., "A Fast Automaton-Based Method for Detecting Anomalous Program Behaviors", In Proceedings of the IEEE Symposium on Security & Privacy (S&P '01), Oakland, CA, US, May 14-16, 2001, pp, 144-155.
Seo, J. and Cha, S., "Masquerade Detection Based on SVM and Sequence-Based User Commands Profile", In Proceedings of the 2nd ACM Symposium on Information, Computer and Communications Security (ASIACCS '07), SG, Mar. 20-22, 2007, pp. 398-400.
Shavlik, J. and Shavlik, M., "Selection, Combination, and Evaluation of Effective Software Sensors for Detecting Abnormal Computer Usage", In Proceedings of the 10th ACM SIGKDD International Conference on Knowledge Discovery and Data Mining (KDD '04), Seattle, WA, USA, Aug. 22-25, 2004, pp. 276-285.
Smith, S., "Magic Boxes and Boots: Security in Hardware", In IEEE Computer, vol. 37, No. 10, Oct. 2004, pp. 106-109.
Sommers, J. and Barford, P., "Self-Configuring Network Traffic Generation", In Proceedings of the 4th ACM SIGCOMM Conference on Internet Measurement (IMC '04), Taormina, Sicily, IT, Oct. 25-27, 2004, pp, 68-81.
Song, Y., et al., "On the Infeasibility of Modeling Polymorphic Shellcode", In Proceedings of the 14th ACM Conference on Computer and Communications Security (CCS '07), Alexandria, VA, USA, Oct. 29-Nov. 2, 2007, pp. 541-551.
Spitzner, L., "Honeypots: Catching the Insider Threat", In Proceedings of the 19th Annual Computer Security Applications Conference (ACSAC '03), Las Vegas, NV, USA, Dec. 8-12. 2003, pp. 170-179.
Spitzner, L., "Honeytokens: The Other Honeypot", Technical Report, Security Focus, Jul. 17, 2003, pp. 1-5, available at: http://www.symantec.com/connect/articles/honeytokens-other-honeypot.
Spray, S. and Cooper, A., "The Unique Signal Concept for Detonation Safety in Nuclear Devices", Technical Report UC-706, Sandia National Laboratories, Dec. 1992, pp. 1-73.

(56) References Cited

OTHER PUBLICATIONS

Srivastava, A. and Giffin, J., "Tamper-Resistant, Application-Aware Blocking of Malicious Network Connections", In Proceedings of the 11th International Symposium on Recent Advances in Intrusion Detection (RAID '08), Cambridge, MA, USA, Sep. 15-17, 2008, pp. 39-58.
Ståhlberg, M., "The Trojan Money Spinner", Technical Report, F-Secure Corporation, Sep. 2007, pp. 1-7, available at: http://www.f-secure.com/weblog/archives/VB2007_TheTrojanMoneySpinner.pdf.
Stolle, S.J., et al., "A Comparative Evaluation of Two Algorithms for Windows Registry Anomaly Detection", In Journal of Computer Security, vol. 13, No. 4, Jul. 2005, pp. 659-693.
Stolfo, S.J., et al, "Anomaly Detection in Computer Security and an Application to File System Accesses", In Proceedings of the 15th International Syposium on Methodologies for Intelligent Systems (ISMIS '05), Saratoga Springs, NY, USA, May 25-28, 2005, pp. 14-28.
Stolfo, S.J., et al., "Fileprint Analysis for Malware Detection", Technical Report, Columbia University, Jun. 2005, pp. 1-12.
Stolfo, S.J., et al., "Insider Attack and Cyber Security: Beyond the Hacker", Springer, ISBN-10: 0387773215, Apr. 7, 2008, pp. 1-228.
Stolfo, S.J., et al., "Towards Stealthy Malware Detection", Malware Detection, Advances in Information Security, vol. 27, 2007, pp. 231-249.
Stoll, C., "Stalking the Wily Hacker", In Communications of the ACM, vol. 31, No. 5, May 1988, pp. 484-497.
Yung. K.H., "Using Self-Consistent Naive-Bayes to Detect Masqueraders", In Stanford Electrical Engineering and Computer Science Research Journal, 2004, pp. 14-21.
Symantec, "Global Internet Security Threat Report: Trends for Jul.-Dec. 2007", Apr. 2008, pp. 1-97, available at: http://eval.symantec.com/mktginfo/enterprise/white_papers/b-whitepaper_internet_security_threat_report_xiii_04-2008.en-us.pdf.
Szor, P. and Ferrie, P., "Hunting for Metamorphic", Technical Report, Symantec Corporation, Jun. 2003, pp. 1-23.
Szymanski, B.K. and Zhang, Y., "Recursive Data Mining for Masquerade Detection and Author Identification", In Proceedings from the 5th Annual IEEE SMC Information Assurance Workshop, West Point, NY, US, Jun. 10-11, 2004, pp. 424-431.
Tan, K.M.C. and Maxion, R.A., "'Why 6?' Defining the Operational Limits of Stide, and Anomaly-Based Intrusion Detector", In Proceedings of the IEEE Symposium on Security and Privacy (S&P '02), Berkeley, CA, USA, May 12-15, 2002, pp. 188-201.
Teng, H.S., et al., "Adaptive Real-Time Anomaly Detection Using Inductively Generated Sequential Patterns", In Proceedings of the IEEE Symposium on Security and Privacy (S&P '90), Oakland, CA, US, May 7-9, 1990, pp. 278-284.
The Honeynet Project, "Know Your Enemy: Sebek, A Kernel Based Data Capture Tool", Technical Report, Nov. 17, 2003, pp. 1-21, available at: http://old.honeynet.org/papers/sebek.pdf.
The International Search Report and Written Opinion of the International Searching Authority, International Patent Application No. PCT/US2008/066623, filed Dec. 6, 2008.
Trusteer "Measuring the In-the-Wild Effectiveness of Antivirus Against Zeus", Technical Report, Sep. 14, 2009, pp. 1-6, available at: www.trusteer.com/files/Zeus_and_Antivirus.pdf.
Tsow, A., et al., "Warkitting: The Drive-by Subversion of Wireless Home Routers", In Journal of Digital Forensic Practice, vol. 1, No. 3, Sep. 2006, pp. 179-192.
Turing, A.M., "Computing Machinery and Intelligence", In Mind, New Series, vol. 59, No. 236, Oct. 1950, pp. 433-460.
Tygar, J.D. and Yee, B., "DYAD: A System for Using Physically Secure Coprocessors", Technical Report CMU-CS-91-140R, Carnegie Mellon University, May 1991, pp. 1-36.
U.S. Appl. No. 12/302,774, filed May 27, 2009.
U.S. Appl. No. 12/565,394, filed Sep. 23, 2009.
U.S. Appl. No. 12/628,587, filed Dec. 1, 2009.
U.S. Appl. No. 13/166,723, filed Jun. 22, 2011.
U.S. Appl. No. 60/809,898, filed May 31, 2006.
U.S. Appl. No. 60/934,307, filed Jun. 12, 2007.
U.S. Appl. No. 61/044,376, filed Apr. 11, 2008.
U.S. Appl. No. 61/099,526, filed Sep. 23, 2008.
U.S. Appl. No. 61/119,294, filed Dec. 2, 2008.
U.S. Appl. No. 61/119,540, filed Dec. 3, 2008.
U.S. Appl. No. 61/165,634, filed Apr. 1, 2009.
U.S. Appl. No. 61/357,481, filed Jun. 22, 2010.
Vahdat, A., et al, "Scalabliity and Accuracy in a Large-Scale Network Emulator", In Proceedings of the 5th Symposium on Operating Systems Design and Implementation (OSDI '02), Boston, MA, USA, Dec. 9, 2002, pp. 261-284.
Vargiya, R. and Chan, P., "Boundary Detection in Tokenizing Network Application Payload for Anomaly Detection", In Proceedings of the ICDM Workshop on Data Mining for Computer Security, Nov. 19, 2003, pp. 1-15.
Vasudevan, A. and Yerraballi, R., "Cobra: Fine-Grained Malware Analysis using Stealth Localized-Executions", In Proceedings of the IEEE Symposium on Security & Privacy (S&P '06), Berkeley, CA, USA, May 21-24, 2006, pp. 264-279.
Vishwanath, K.V. and Vahdat, A., "Realistic and Responsive Network Traffic Generation", In Proceedings of the ACM Conference on Applications, Technologies, Architectures, and Protocols for Computer Communications (SIGCOMM '06), vol. 36, No. 4. Pisa, IT, Sep. 11-15, 2006, pp. 111-122.
Walsh, T.J. and Kuhn, D.R., "Challenges in Securing Voice over IP", In IEEE Security & Privacy Magazine, vol. 3, No. 3. May/Jun. 2005, pp. 44-49.
Wang, K. and Stolfo, S.J., "Anomalous Payload-Based Network Intrusion Detection", In Proceedings of the 7th International Symposium on Recent Advances in Intrusion Detection (RAID '04), Sophia Antipolis, FR, Sep. 15-17, 2004, pp. 203-222.
Wang, K. and Stolfo, S.J., "One-Class Training for Masquerade Detection", In Proceedings of the Workshop on Data Mining for Computer Security (DMSEC '03), Melbourne, FL, US, Nov. 19-22, 2003, pp. 1-10.
Wang, K. et al., "Anomalous Payload-Based Worm Detection and Signature Generation", In Recent Advances in Intrusion Detection, Sep. 7-9, 2005, pp. 227-246.
Wang, K., et al., "Anagram: A Content Anomaly Detector Resistant to Mimicry Attack", In Proceedings of the International Conference on Recent Advanced in Intrusion Detection (RAID '06), Hamburg, DE, Sep. 20-22, 2006, pp. 226-248.
Wang, Y.M., et al., "Automated Web Patrol with Strider HoneyMonkeys: Finding Web Sites That Exploit Browser Vulnerabilities", In Proceedings of the 13th Annual Network and Distributed System Security Symposium (NDSS '06), San Diego, CA, USA, Feb. 10-13, 2006, pp. 1-10.
Watson, D., et al., "Know Your Enemy: Phishing", Technical Report, May 16, 2005, pp. 1-87, available at: http://www.honeynet.org/papers/phishing/.
Willems, C., et al., "Toward Automated Dynamic Malware Analysis Using CWSandbox", In IEEE Security & Privacy, vol. 5, No. 2, Mar./Apr. 2007, pp. 32-39.
Written Opinion in International Patent Application No. PCT/US2007/012811, filed May 31, 2007, mailed Jul. 17, 2008.
Written Opinion in International Patent Application No. PCT/US2008/066623, filed Jun. 12, 2008, mailed Feb. 13, 2009.
Yang, J., et al., "Automatically Generating Malicious Disks using Symbolic Execution", In Proceedings of the IEEE Symposium on Security & Privacy (S&P '06). Berkeley, CA, USA, May 21-24, 2006. pp. 243-257.
Ye, N., "A Markov Chain Model of Temporal Behavior for Anomaly Detection", In Proceedings of the IEEE Workshop on Information Assurance and Security (IAS '00), West Point, NY, USA, Jun. 6-7, 2000, pp. 171-174.
Ye, N., et al., "Probabilistic Techniques for Intrusion Detection Based on Computer Audit Data", In IEEE Transactions on Systems, Man and Cybernetics, Part A, vol. 31, No. 4, Jul. 2001, pp. 266-274.
Ye, Z., et al., "Trusted Paths for Browsers", In ACM Transactions on Information and System Security (TISSEC '05), vol. 8, No. 2, May 2005, pp. 153-186.

(56) References Cited

OTHER PUBLICATIONS

Yee, B., "Using Secure Coprocessors", PhD Thesis, Carnegie Mellon University, May 1994, pp. 1-91.

Yegneswaran, V., et al., "On the Design and Use of Internet Sinks for Network Abuse Monitoring", In Proceedings of the 7th International Symposium on Recent Advances in Intrusion Detection (RAID '04), Sophia Antipolis, FR, Sep. 15-17, 2004, pp. 140-165.

Yin, H., et al., "Panorama: Capturing System-Wide Information Flow for Malware Detection and Analysis", In Proceedings of the 14th ACM Conference on Computer and Communications Security (CCS '07), Alexandria, VA, USA, Oct. 29-Nov. 2, 2007, pp. 116-127.

Yuill, J., et al., "Honeyfiles: Deceptive Files for Intrusion Detection", In Proceedings of the 5th Annual IEEE Workshop on Information Assurance, West Point, NY, USA, Jun. 10-11, 2004, pp. 116-122.

Yuill, J., et al., "Using Deception to Hide Things from Hackers: Processes, Principles, and Techniques", In Journal of Information Warfare, vol. 5, No. 3, Nov. 2006, pp. 26-40.

Yung, K.H., "Using Self-Consistent Naïve-Bayes to Detect Masqueraders", In Proceedings of the Advances in Knowledge Discovery and Data Mining, 8th Pacific-Asia Conference (PAKDD '04), Sydney, AU, May 26-28, 2004, pp. 329-340.

Notice of Allowance dated Nov. 30, 2015 in U.S. Appl. No. 14/272,099.

Office Action dated Mar. 19, 2015 in U.S. Appl. No. 14/272,099.

Office Action dated Jun. 5, 2015 in U.S. Appl. No. 14/642,401.

Office Action dated Jul. 10, 2015 in U.S. Appl. No. 14/339,245.

Office Action dated Dec. 8, 2015 in U.S. Appl. No. 13/166,723.

Yeung, D. and Ding, Y., "Host-Based Intrusion Detection using Dynamic and Static Behavioral Models", In Pattern Recognition, vol. 36, No. 1, Nov. 22, 2001, pp. 229-243.

Bowen, B.M. et al., "Baiting Inside Attackers Using Decoy Documents", In Lecture Notes of the Institute for Computer Sciences, Social Informatics and Telecommunications Engineering Security and Privacy in Communication Networks, vol. 19, 2009, pp. 51-70.

Dustman, A., "MySQL for Python", available at: http://sourceforge.net/projects/mysql-python/, last accessed: Jun. 2, 2017, pp. 1-4.

K2. ADMmutate, available at: http://www.ktwo.ca/security.html, last accessed: Jun. 2, 2017, pp. 1.

Office Action dated Dec. 9, 2015 in U.S. Appl. No. 14/642,401.

Spybot, "Spybot +AV: Anti-Malware, Anti-Spyware and Antivirus Software Solution", Last Accessed Jul. 6, 2016, available at: http://security.kolla.de/, pp. 1-3.

The Apache Jakarta Project, available at: http://jakarta.apache.org/, last accessed: Jun. 2, 2017, pp. 1.

The XFree86 Project, available at: http://www.xfree86.org, last accessed: Jun. 2, 2017, pp. 1-2.

VMware, Inc., "VMware", available at: http://www.vmware.com/, last accessed: Jun. 2, 2017, pp. 1-4.

WvWare, available at: http://wvware.sourceforge.net/, last accessed: Jun. 2, 2017, pp. 1-4.

Office Action dated Jul. 24, 2017 in U.S. Appl. No. 15/155,790.

Office Action dated Oct. 12, 2017 in U.S. Appl. No. 15/056,627.

Office Action dated Dec. 5, 2017 in U.S. Appl. No. 13/166,723.

\* cited by examiner

< ActionType > ::= < WinLogin >< ActionType >
| < CoverType >< ActionType > | < CarryType >< ActionType >
|< WinLogout > | < VerifyAction >< ActionType > | ∈
< CoverAction > ::= < BrowserAction >< CoverAction >
| < WordAction >< CoverAction >
| < SysAction >< CoverAction >
< BrowserAction > ::= < URLRequest >< BrowserAction >
| < OpenLink >< BrowserAction > | < Close >
< WordAction > ::= < NewDoc >< WordAction >
| < EditDoc >< WordAction > | < Close >
< SysAction > ::= < OpenWindow > |<MaxWindow >
|<MinWindow > | < CloseWindow >
< VerifyAction > ::= Img1 | Img2 | ... | ImgN | Unknown
< CarryAction > ::= < PayPalInject > | < GmailInject >
| < CCInject > | < UnivInject > | < BankInject >

FIG. 7

```
browser_name(ffield_hidden): Microsoft Internet Explorer
browser_version(ffield_hidden): 6
operating_system(ffield_hidden): Windows
https://www.paypal.com/cgi-bin/webscr?cmd=_login-submit&di
post
(ffield_):
login_email(ffield_text): toddndavis@gmail.com
login_password(ffield_password): LKJL2l3dm
target_page(ffield_select-one): 0
target_page(select): 0
submit.x(ffield_submit): Log In
```

FIG. 8

| # | Domain / IP address | Count | Dropzone Script | Count |
|---|---|---|---|---|
| 1 | varxx.com | 20808 | /xt/gate.php | 20808 |
| 2 | neverevensite.ru | 18890 | /gate321.php | 18890 |
| 3 | 85.224.124.151:555 | 17101 | /temp/stnk.php | 17820 |
| 4 | 85.60.30.114 | 13218 | /~atmactc1/z/gate.php | 13218 |
| 5 | podgorz.org | 9500 | /zno/zswcb_cleaned/gate.php | 9500 |
| 6 | kesahnaepri.ru | 8042 | /y00/_gate.php | 6238 |
| 7 | witahquahtt.ru | 4703 | /cp11/zengate.php | 4243 |
| 8 | community-infinitie.net | 3436 | /cp01/zengate.php | 2045 |
| 9 | esver3.ru | 2045 | /klo/_gate.php | 2892 |
| 10 | phaizaipean.ru | 2702 | /cache/lang_cache/web/s.php | 2858 |

FIG. 9

METHODS, SYSTEMS, AND MEDIA FOR DETECTING COVERT MALWARE

CROSS REFERENCE TO RELATED APPLICATIONS

This application is a continuation of U.S. patent application Ser. No. 12/982,984, filed Dec. 31, 2010, which claims the benefit of U.S. Provisional Patent Application No. 61/291,712, filed Dec. 31, 2009, which are hereby incorporated by reference herein in their entireties.

STATEMENT REGARDING FEDERALLY SPONSORED RESEARCH OR DEVELOPMENT

The invention was made with government support under Grant No. CNS-07-14647 and Grant No. CNS-09-14312 awarded by the National Science Foundation (NSF) and under Grant No. N00014-07-1-0907 awarded by the Multidisciplinary University Initiative (MURI) of the Office of Naval Research (ONR). The government has certain rights in the invention.

TECHNICAL FIELD

The disclosed subject matter relates to methods, systems, and media for detecting covert malware.

BACKGROUND

The advent and rapid growth of an underground economy that trades stolen digital credentials has spurred the growth of crimeware-driven bots and other malware that harvest sensitive data from unsuspecting users. This form of malevolent software uses a variety of techniques from web-based form grabbing and keystroke logging to screen and video capturing for the purpose of pilfering data on remote hosts to execute a financial crime. The targets of such malware range from individual users and small companies to the wealthiest organizations.

Traditional crimeware detection techniques rely on comparing signatures of known malicious instances to identify unknown samples or on anomaly-based detection techniques in which host behaviors are monitored for large deviations from baseline behaviors. However, these approaches suffer from a large number of known weaknesses. For example, signature-based approaches can be useful when a signature is known, but due to the large number of possible variants, learning and searching all of the possible signatures to identify unknown binaries is intractable. In another example, anomaly-based approaches are susceptible to false positives and false negatives, thereby limiting their potential utility. Consequently, a significant amount of existing crimeware or malware currently operates undetected by these crimeware detection techniques.

Another drawback to these detection techniques, such as conventional host-based antivirus software, is that it typically monitors from within its host computer. This makes the antivirus software vulnerable to evasion or subversion by malware. More particularly, the number of malware attacks that disable defenses, such as antivirus software, prior to undertaking some malicious activity is constantly increasing.

There is therefore a need in the art for approaches that detect covert malware. Accordingly, it is desirable to provide methods, systems, and media that overcome these and other deficiencies of the prior art.

SUMMARY

In accordance with various embodiments, mechanisms for detecting covert malware are provided.

These mechanisms are provided for detecting crimeware, such as covert malware, using tamper resistant injection of believable decoys. In particular, decoy information or any other suitable bait information is injected whereby bogus information (e.g., logins, passwords, account numbers, etc.) is used to bait and delude crimeware, thereby forcing it to reveal itself during the exfiltration or exploitation of the monitored decoy information.

As generally described herein, these mechanisms use decoy information to attract, deceive, and/or confuse covert malware. For example, large amounts of decoy information can be generated and injected or inserted into a computing environment to lure or entice covert malware into stealing bogus information. Among other things, decoy information can be used to reduce the level of system knowledge of the covert malware, entice the covert malware to perform actions that reveal their presence and/or identities, and uncover and track the unauthorized activities of the covert malware.

In some embodiments, these mechanisms inject monitored decoy information into a host computing environment by simulating user activity that can be of interest to crimeware or covert malware. Simulated user activity can be generated using a model of actual user activity (e.g., by monitoring, recording, modifying, and/or replaying actual user activity in a computing environment, by using one or more biometric models, etc.). After simulated user activity is injected and/or conveyed to the computing environment, the detection mechanisms can determine whether the state of the computing environment matches an expected state of the computing environment. That is, these detection mechanisms can include a simulation and injection component for generating and transmitting simulated user activity, such as mouse and keyboard events, and a verification component for verifying state information in response to the injected simulated user activity. The verification can be a comparison based on, for example, the graphical output of a portion of a display screen, the number of messages in particular conversations, the absolute number of pixels in a portion of a display screen, etc.

In response to the verification, the mechanisms can then determine whether traffic indicates the presence of covert malware in the application and can determine whether a decoy corresponding to the simulated user activity has been accessed by an unauthorized entity. In a more particular example, the existence of credential stealing malware can be monitored and detected by impersonating a user login to a sensitive website using decoy credentials and detecting whether this specific account was accessed by anyone else except for the system. This provides clear and concrete evidence that the credentials were stolen and that an entity other than the system attempted to check the validity and/or value of that account.

It should be noted that, in some embodiments, the content of the decoy information itself can be used to detect covert malware. For example, decoy information can include one or more decoy PayPal accounts tied to bogus identities, one or more decoy Gmail accounts with bogus logins and passwords, or one or more decoy bank accounts from large financial institutions. In some embodiments, these decoy accounts can be created and provided from collaborating companies. In some embodiments, the bogus logins to sensitive websites and other decoy information can be monitored by external approaches (e.g., polling a website or using a custom script that accesses mail.google.com and parses the bait account pages to gather account activity information). More particularly, monitors or other external approaches can be created to obtain or poll information relating to these decoy accounts—e.g., last login time, IP address, etc.

It should be also noted that, in some embodiments, the detection mechanisms operate external to the host computing environment making it difficult to subvert by malware residing within the host computing environment.

It should further be noted that, in some embodiments, believable decoy information and believable simulated user activity is injected into the host computing environment. More particularly, the detection mechanisms provide replayed user actions or user activity such that the believable decoy information and believable simulated user activity is indistinguishable by covert malware or any other crimeware to avoid elusion.

In accordance with various embodiments of the disclosed subject matter, methods, systems, and media for detecting covert malware are provided. In some embodiments, a method for detecting covert malware in a computing environment is provided, the method comprising: receiving a first set of user actions; generating a second set of user actions based on the first set of user actions and a model of user activity; conveying the second set of user actions to an application inside the computing environment; determining whether state information of the application matches an expected state after the second set of user actions is conveyed to the application; and determining whether covert malware is present in the computing environment based at least in part on the determination.

In accordance with some embodiments, a system for detecting covert malware in a computing environment is provided, the system comprising a processor that: a hardware processor that is configured to: receive a first set of user actions; generate a second set of user actions based on the first set of user actions and a model of user activity; convey the second set of user actions to an application inside the computing environment; determine whether state information of the application matches an expected state after the second set of user actions is conveyed to the application; and determine whether covert malware is present in the computing environment based at least in part on the determination.

In accordance with some embodiments, a non-transitory computer-readable medium containing computer-executable instructions that, when executed by a processor, cause the processor to perform a method for detecting covert malware in a computing environment is provided. The method comprises: receiving a first set of user actions; generating a second set of user actions based on the first set of user actions and a model of user activity; conveying the second set of user actions to an application inside the computing environment; determining whether state information of the application matches an expected state after the second set of user actions is conveyed to the application; and determining whether covert malware is present in the computing environment based at least in part on the determination.

BRIEF DESCRIPTION OF THE DRAWINGS

FIG. 7 is a diagram showing an example of a formal language that specifies a sequence of user activity in accordance with some embodiments of the disclosed subject matter.

FIG. 8 is a diagram showing an example of monitored network traffic elicited from a Sinowal Trojan in accordance with some embodiments of the disclosed subject matter.

FIG. 9 is a diagram showing an example from a thin client environment of the top IP addresses that covert malware communicates with and the top script names that exfiltrated data in accordance with some embodiments of the disclosed subject matter.

DETAILED DESCRIPTION

Figure 1:
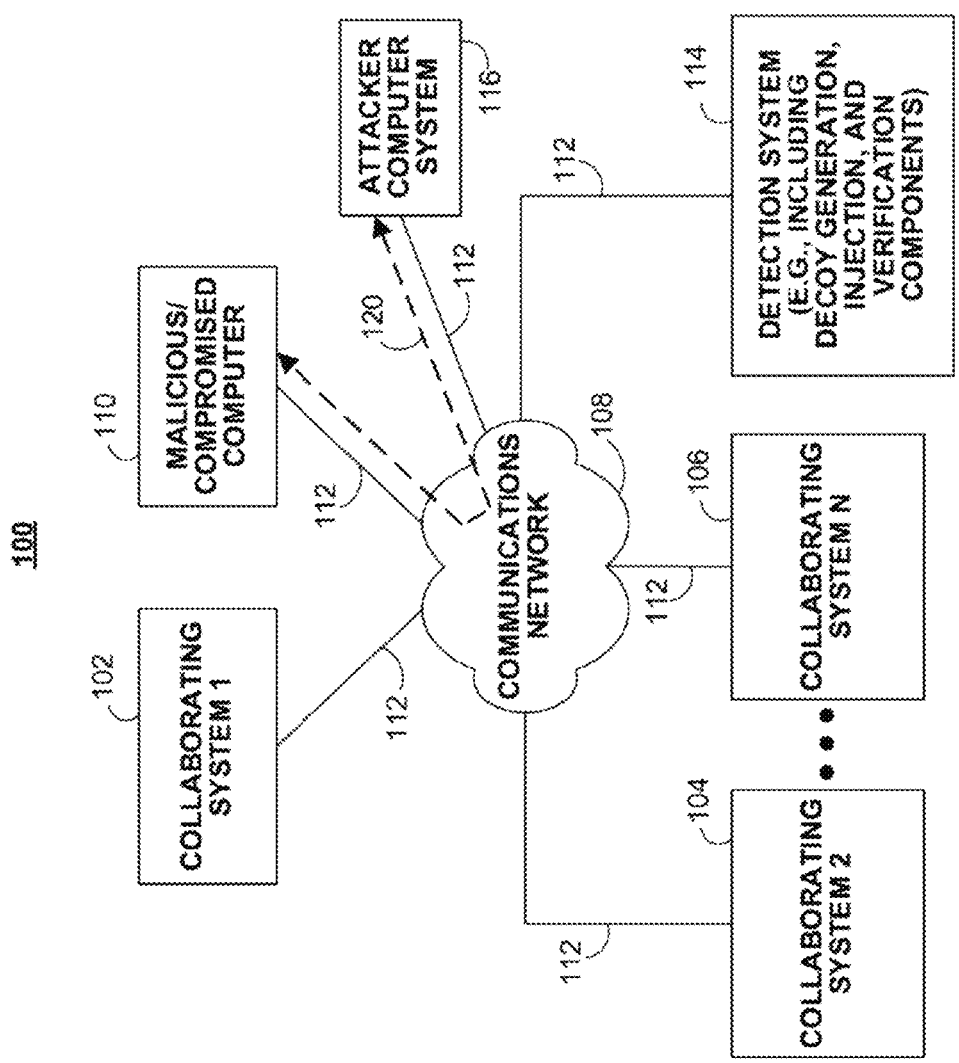
FIG. 1 is a diagram of a system suitable for implementing an application that detects covert malware in accordance with some embodiments of the disclosed subject matter.

In accordance with various embodiments, as described in more detail below, mechanisms for detecting covert malware are provided. These mechanisms are provided for detecting crimeware, such as covert malware, using tamper resistant injection of believable decoys. In particular, decoy information or any other suitable bait information is injected whereby bogus information (e.g., logins, passwords, account numbers, etc.) is used to bait and delude crimeware, thereby forcing it to reveal itself during the exfiltration or exploitation of the monitored decoy information.

As generally described herein, these mechanisms use decoy information (sometimes referred to herein as "decoys" or "bait information") to attract, deceive, and/or confuse covert malware. For example, large amounts of decoy information can be generated and injected or inserted into a computing environment to lure or entice covert malware into stealing bogus information. Among other things, decoy information can be used to reduce the level of system knowledge of the covert malware, entice the covert malware to perform actions that reveal their presence and/or identities, and uncover and track the unauthorized activities of the covert malware.

These and other approaches for generating trap-based decoy information and baiting inside attackers are also described, for example, in Stolfo et al. U.S. Patent Application Publication No. 2010/0077483, filed Sep. 23, 2009, which is hereby incorporated by reference herein in its entirety.

In some embodiments, these mechanisms inject monitored decoy information into a host computing environment by simulating user activity that can be of interest to crimeware or covert malware. Simulated user activity can be generated using a model of actual user activity (e.g., by monitoring, recording, modifying, and/or replaying actual user activity in a computing environment, by using one or more biometric models, etc.). After simulated user activity is injected and/or conveyed to the computing environment, the detection mechanisms can determine whether the state of the computing environment matches an expected state of the computing environment. That is, these detection mechanisms can include a simulation and injection component for generating and transmitting simulated user activity, such as mouse and keyboard events, and a verification component for verifying state information in response to the injected simulated user activity. The verification can be a comparison based on, for example, the graphical output of a portion of a display screen, the number of messages in particular conversations, the absolute number of pixels in a portion of a display screen, etc.

In response to the verification, the mechanisms can then determine whether traffic indicates the presence of covert malware in the application and determine whether a decoy corresponding to the simulated user activity has been accessed by an unauthorized entity. In a more particular example, the existence of credential stealing malware can be monitored and detected by impersonating a user login to a sensitive website using decoy credentials and detecting whether this specific account was accessed by anyone else except for the system. This provides clear and concrete evidence that the credentials were stolen and that an entity other than the system attempted to check the validity and/or value of that account.

It should be noted that, in some embodiments, the content of the decoy information itself can be used to detect covert malware. For example, decoy information can include one or more decoy PayPal accounts tied to bogus identities, one or more decoy Gmail accounts with bogus logins and passwords, or one or more decoy bank accounts from large financial institutions. In some embodiments, these decoy accounts can be created and provided from collaborating companies. In some embodiments, the bogus logins to sensitive websites and other decoy information can be monitored by external approaches (e.g., polling a website or using a custom script that accesses mail.google.com and parses the bait account pages to gather account activity information). More particularly, monitors or other external approaches can be created to obtain or poll information relating to these decoy accounts—e.g., last login time, IP address, etc.

It should be also noted that, in some embodiments, the detection mechanisms operate external to the host computing environment making it difficult to subvert by malware residing within the host computing environment.

It should further be noted that, in some embodiments, believable decoy information and believable simulated user activity is injected into the host computing environment. More particularly, the detection mechanisms provide replayed user actions or user activity such that the believable decoy information and believable simulated user activity is indistinguishable by covert malware or any other crimeware to avoid elusion.

These mechanisms can be used in a variety of applications. For example, in a virtual machine environment, an out-of-host agent external to a virtual machine-based host can insert simulated user activity into a virtual machine environment to convince covert malware residing within the guest operating system that it has captured legitimate credentials. In another example, in a thin client environment, an out-of-host agent can be deployed as a thin client external to a central virtual machine-based host, where a thin client remote access interface can be used to inject and verify simulated user activity. In yet another suitable example, a wireless device-based architecture can be provided in which simulated mouse and keyboard events can be injected wirelessly into a host using the Bluetooth protocol.

Turning to FIG. 1, an example of a system 100 in which the detection mechanisms can be implemented is shown. As illustrated, system 100 includes multiple collaborating computer systems 102, 104, and 106, a communication network 108, a malicious/compromised computer 110, communication links 112, a detection system 114, and an attacker computer system 116.

Collaborating systems 102, 104, and 106 can be systems owned, operated, and/or used by universities, businesses, governments, non-profit organizations, families, individuals, and/or any other suitable person and/or entity. Collaborating systems 102, 104, and 106 can include any number of user computers, servers, firewalls, routers, switches, gateways, wireless networks, wired networks, intrusion detection systems, and any other suitable devices. Collaborating systems 102, 104, and 106 can include one or more processors, such as a general-purpose computer, a special-purpose computer, a digital processing device, a server, a workstation, and/or various other suitable devices. Collaborating systems 102, 104, and 106 can run programs, such as operating systems (OS), software applications, a library of functions and/or procedures, background daemon processes, and/or various other suitable programs. In some embodiments, collaborating systems 102, 104, and 106 can support one or more virtual machines. Any number (including only one) of collaborating systems 102, 104, and 106 can be present in system 100, and collaborating systems 102, 104, and 106 can be identical or different.

Communication network 108 can be any suitable network for facilitating communication among computers, servers, etc. For example, communication network 108 can include private computer networks, public computer networks (such as the Internet), telephone communication systems, cable television systems, satellite communication systems, wireless communication systems, any other suitable networks or systems, and/or any combination of such networks and/or systems.

Malicious/compromised computer 110 can be any computer, server, or other suitable device that includes the covert malware. In addition, malicious/compromised computer 110 can be used to launch a computer threat, such as a virus, worm, trojan, rootkit, spyware, key recovery attack, denial-of-service attack, malware, probe, etc. The owner of malicious/compromised computer 110 can be any university, business, government, non-profit organization, family, individual, and/or any other suitable person and/or entity.

It should be noted that, in some embodiments, an external attacker can become an inside attacker when the external attacker attains internal network access. For example, using spyware, rootkits, or any other suitable malware, external attackers can gain access to communications network 108. Such software can easily be installed on computer systems from physical or digital media (e.g., email, downloads, etc.) that provides an external attacker with administrator or "root" access on a machine along with the capability of gathering sensitive data. The external attacker can also snoop or eavesdrop on one or more systems 102, 104, and 106 or communications network 108, download and exfiltrate data, steal assets and information, destroy critical assets and information, and/or modify information. Rootkits have the ability to conceal themselves and elude detection, especially when the rootkit is previously unknown, as is the case with zero-day attacks. An external attacker that manages to install rootkits internally in effect becomes an insider, thereby multiplying the ability to inflict harm.

In some embodiments, the owner of malicious/compromised computer 110 may not be aware of what operations malicious/compromised computer 110 is performing or may not be in control of malicious/compromised computer 110. Malicious/compromised computer 110 can be acting under the control of another computer (e.g., attacker computer system 116) or autonomously based upon a previous computer attack which infected computer 110 with a virus, worm, trojan, spyware, malware, probe, etc. For example, some malware can passively collect information that passes through malicious/compromised computer 110. In another example, some malware can take advantage of trusted relationships between malicious/compromised computer 110 and other systems 102, 104, and 106 to expand network access by infecting other systems. In yet another example, some malware can communicate with attacking computer system 116 through an exfiltration channel 120 to transmit confidential information (e.g., IP addresses, passwords, credit card numbers, etc.).

It should be noted that any number of malicious/compromised computers 110 and attacking computer systems 116 can be present in system 100, but only one is shown in FIG. 1 to avoid overcomplicating the drawing.

More particularly, for example, each of the one or more collaborating or client computers 102, 104, and 106, malicious/compromised computer 110, detection system 114, and attacking computer system 116, can be any of a general purpose device such as a computer or a special purpose device such as a client, a server, etc. Any of these general or special purpose devices can include any suitable components such as a processor (which can be a microprocessor, digital signal processor, a controller, etc.), memory, communication interfaces, display controllers, input devices, etc. For example, client computer 1010 can be implemented as a personal computer, a personal data assistant (PDA), a portable email device, a multimedia terminal, a mobile telephone, a set-top box, a television, etc.

In some embodiments, any suitable computer readable media can be used for storing instructions for performing the processes described herein, can be used as a content distribution that stores content and a payload, etc. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Referring back to FIG. 1, communication links 112 can be any suitable mechanism for connecting collaborating systems 102, 104, 106, malicious/compromised computer 110, detection system 114, and attacking computer system 116 to communication network 108. Links 112 can be any suitable wired or wireless communication link, such as a T1 or T3 connection, a cable modem connection, a digital subscriber line connection, a Wi-Fi or 802.11(a), (b), (g), or (n) connection, a dial-up connection, and/or any other suitable communication link. Alternatively, communication links 112 can be omitted from system 100 when appropriate, in which case systems 102, 104, and/or 106, computer 110, and/or detection system 114 can be connected directly to communication network 108.

Detection system 114 can be any computer, server, router, or other suitable device for modeling, generating, inserting, distributing, monitoring, verifying, and/or managing decoy information into system 100. Similar to collaborating systems 102, 104, and 106, detection system 114 can run programs, such as operating systems (OS), software applications, a library of functions and/or procedures, background daemon processes, and/or various other suitable programs. In some embodiments, detection system 114 can support one or more virtual machines.

Figure 2:
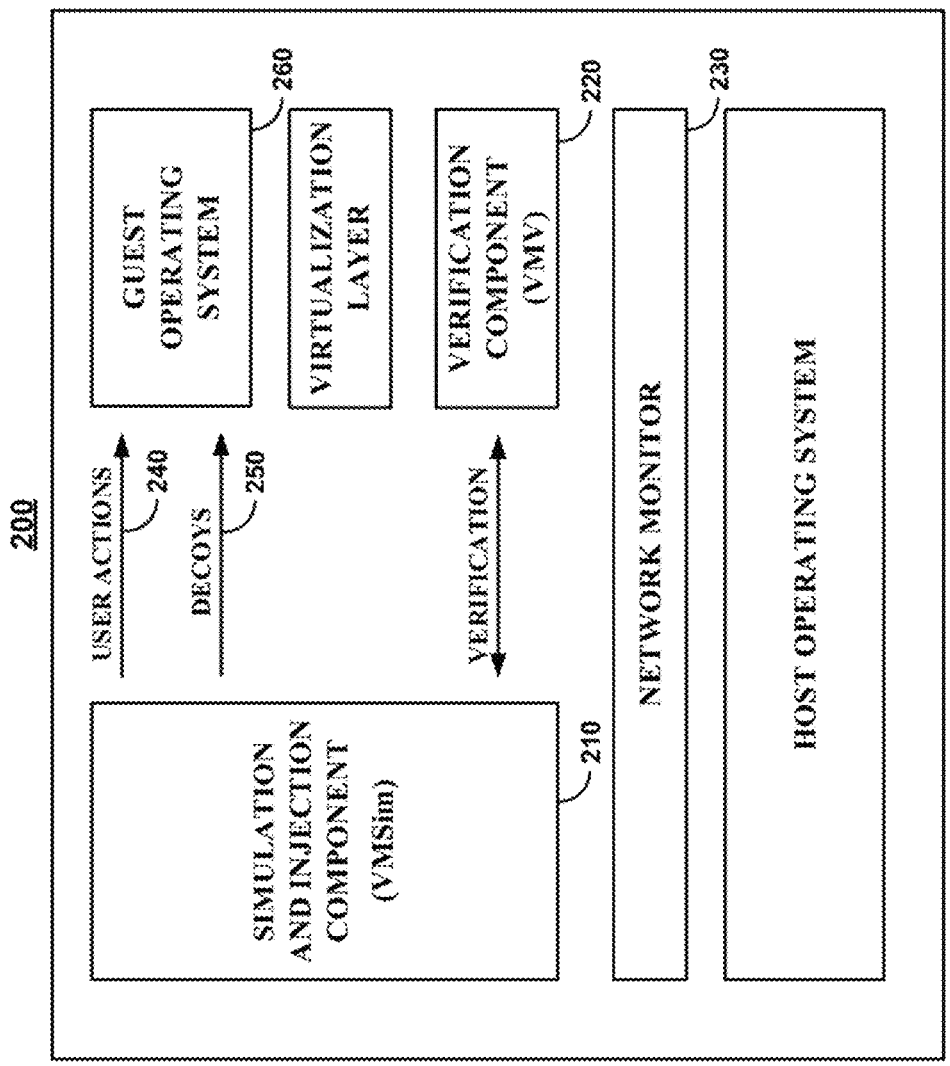
FIG. 2 is a diagram of a detection system external to a virtual-machine based host that detects covert malware in accordance with some embodiments of the disclosed subject matter.

In a more particular example, detection system 114 can be implemented in a virtual machine environment, where an out-of-host agent drives simulated user activity that is meant to convince covert malware residing within the guest operating system that it has captured legitimate credentials. This is generally applicable to systems that are fully virtualized (e.g., VMWare) and the operating systems on which they are supported. An illustrative example of detection system 114 implemented in a virtual machine architecture is shown in FIG. 2.

As shown, architecture 200 can include a simulation and injection component 210 (sometimes referred to herein as "VMSim" or a "simulation engine"), a virtual machine verification (VMV) component 220, and a network monitoring component 230. Simulation and injection component 210 executes outside of a virtual machine and passes its actions (e.g., user actions 240 and simulated user activity or decoys 250) into a guest operating system 260. More particularly, simulation and injection component 210 generates simulated user activity 250 by recording, modifying, and replaying keyboard and mouse events captured from users. In addition, simulation and injection component 210 can replay and inject monitored user activity (without decoys) to increase the believability of the simulated user activity 250. Upon the injection of simulated user activity 250, virtual machine verification component 220 can be used to determine whether the state of the virtual machine is an expected state (e.g., one of a number of predefined states). Network monitoring component 230 can then detect when covert malware attempts to exfiltrate data. For example, network monitoring component 230 records and transmits alerts in response to determine that malicious traffic is originating from the virtual machine host.

Figure 3:
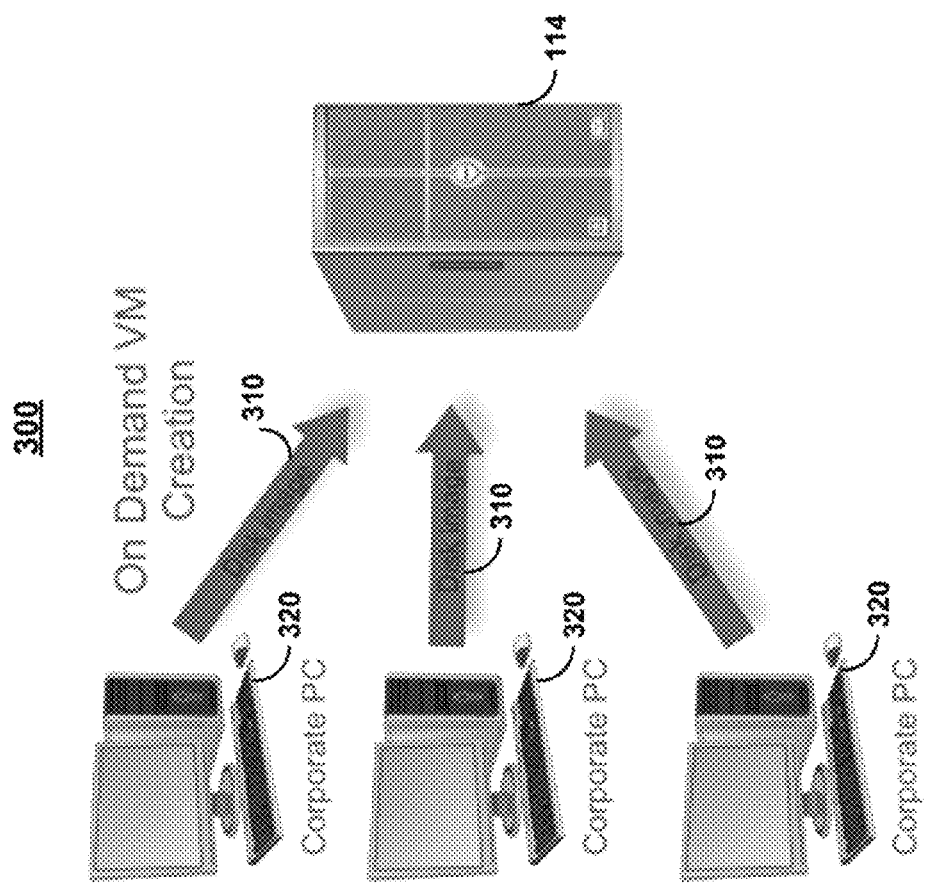
FIG. 3 is a diagram of a detection system deployed in an enterprise environment with non-virtual machine-based hosts that detects covert malware in accordance with some embodiments of the disclosed subject matter.

Alternatively or additionally, detection system 114 and its detection mechanisms can be deployed in an enterprise environment. For example, detection system 114 can be used in an enterprise environment to monitor for site-specific credential misuse and to profile attackers targeting that environment. In a more particular example, detection system 114 can be deployed to run simulations on a user's system (e.g., one of collaborating systems 102, 104, or 106) when it is idle (e.g., during meetings, at particular times during the night, etc.). Virtual machines can be created on demand from a user's native environment. For example, as shown in FIG. 3, detection system 114 is deployed as an enterprise service that runs a simulation over exported copies of multiple users' disk images 310 from corresponding user computers 320. Alternatively, in some embodiments, the machine state of each user computer 320 can be synchronized with the state of the detection system 114. As a result, detection system 114 including, for example, a simulation and injection component 210 of FIG. 2, can use the disk images 310 to simulate user activity and inject the simulated user activity into the enterprise environment 300. This allows detection system 114 to detect covert malware conducting long-term corporate reconnaissance. For example, detection system 114 can be used to detect covert malware that attempts to steal credentials only after they have been repeatedly used in the past. That is, instead of generally detecting covert malware, detection system 114 can be used to detect targeted espionage software.

It should be noted that, in some embodiments, specialized decoy information and general decoy information can be generated, where specialized decoys are used to detect targeted espionage software and where general decoys can be used to assist the organization identify compromised internal users.

Figure 4:
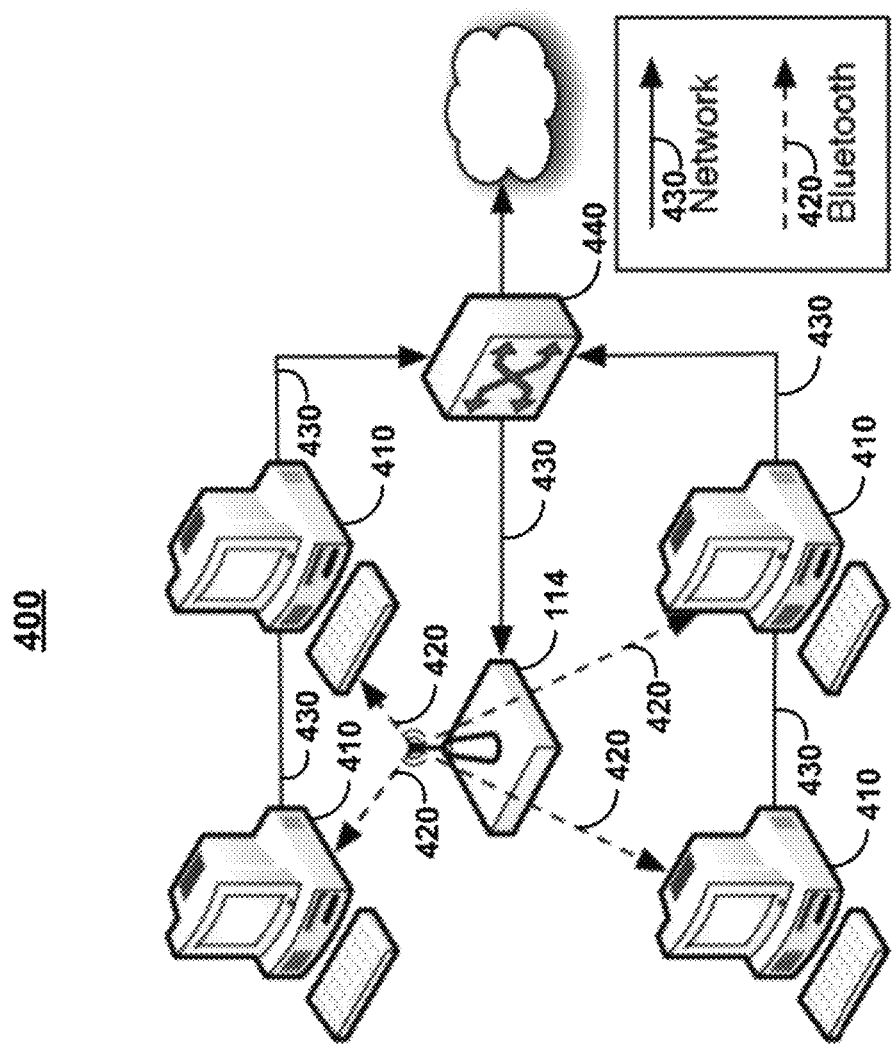
FIG. 4 is a diagram of a detection system deployed in a wireless device-based architecture that detects covert malware in accordance with some embodiments of the disclosed subject matter.

In some embodiments, detection system 114 and its detection mechanisms can be implemented without using virtual machines. For example, a wireless device-based architecture 400, as shown in FIG. 4, provides detection system 114 that injects mouse and keyboard events wirelessly using the Bluetooth protocol or any other suitable wireless protocol into user computers 410 via wireless communication paths 420. In a more particular example, detection system 114 can run a Bluetooth proxy application that receives user activity (e.g., by monitoring network traffic), translates the user activity to Bluetooth human interface device (HID) protocol, and transmits them to a host, such as one of user computers 410. Detection system 114 can, using network verification, verify the success and failure of the injected mouse and keyboard events using traffic analysis of encrypted protocols. For example, as shown in FIG. 4, network traffic 430 can be monitored and portions of the network traffic can be verified to determine whether the output from the injected mouse and keyboard events is as expected.

Figure 5:
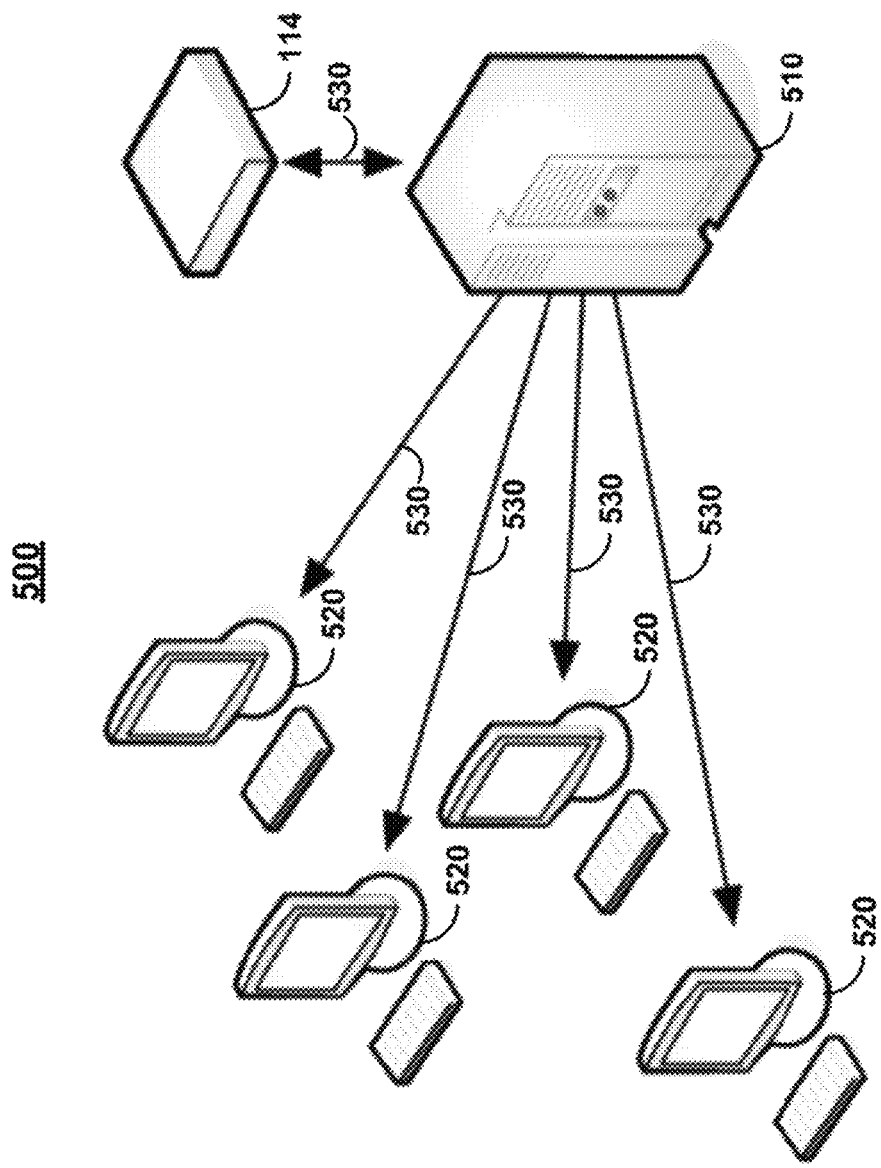
FIG. 5 is a diagram of a detection system deployed in a thin client-based architecture that detects covert malware in accordance with some embodiments of the disclosed subject matter.

In yet another suitable embodiment where detection system 114 and its detection mechanisms can be implemented without using virtual machines, FIG. 5 shows a thin-client based architecture 500 having detection system 114 implemented as a thin client. As shown, thin client-based architecture generally includes a central virtual machine host 510 (which can be one physical server or multiple servers) and one or more dummy computers 520 connected to the host via communication paths 530 (e.g., a local and fast network connection). Detection system 114 and other thin clients 520 transmit user actions (e.g., keyboard events, mouse events, etc.) to central virtual machine host 510 and remotely display the screen output of the virtual machine. That is, particular computations and functionality can be offloaded to host 510. Using thin clients 520, each user can access and use virtual machines hosted on central virtual machine host 510 and detection system 114 can access each hosted virtual machine.

More particularly, detection system 114 is deployed as a thin client (outside of the virtual machines) that periodically connects to each hosted virtual machine and injects decoy credentials. The remote access protocols used in thin client environments (e.g., Citrix, VNC, remote desktop protocol (RDP), etc.) can be used for both injecting simulated user activity or any other suitable decoy information and verification. For example, detection system 114 in the thin client environment can inject decoy credentials into a hosted virtual machine and can then perform a verification of the injected decoys by receiving arbitrary portions of rendered screens and counting the absolute number of pixels in each of the portions.

It should be noted that detection system 114 can generate decoy information (e.g., bogus credentials) that complies with particular properties that enhance the deception for different classes or threat levels of inside attackers. Decoy information can be generated that is, for example, believable, enticing, conspicuous, detectable, variable, differentiable from actual or authentic information, non-interfering with legitimate users, etc.

Detection system 114 can generate decoy information that is believable. That is, decoy information can be generated such that it is difficult for a user to discern whether the decoy information is from a legitimate source or in fact a decoy. For example, decoy information can be generated to appear realistic and indistinguishable from actual information used in the system. More particularly, detection system 114 can record information, events, and network flow in systems 100, 200, 300, 400, and 500. For example, detection system 114 can record user activity, such as keyboard and mouse events, modify the recorded user activity to simulate believable decoy information in the form of simulated user activity. In addition, detection system 114 can replay recorded user activity captured from real users that is not used to simulate user activity, but is used to support the believability of simulated user activity. Accordingly, using actual user activity, simulated user activity, and/or a model of user activity as described herein, covert malware or any other suitable attacking computer does not detect detection system 114 as the source of decoy information.

In some embodiments, detection system 114 can determine whether decoy information complies with a believability property. For example, detection system 114 can perform a decoy Turing test, where portions of decoy information and legitimate information are selected—one contains decoy information and the other contains information randomly selected from authentic information. The two pieces of information can be presented to a volunteer or any other suitable user and the volunteer can be tasked to determine which of the two are authentic. In some embodiments, in response to testing the believability of decoy information and receiving a particular response rate, detection system 114 can consider decoy information to comply with the believability property. For example, detection system 114 can determine whether a particular piece of decoy information, such as a bogus credential, is selected as an authentic and believable piece of information at least 50% of the time, which is the probability if the volunteer user selected at random. In another example, detection system 114 can allow a user, such as an administrator user that has access to detection system 114, to select a particular response rate for the particular type of decoy information. If the decoy information is tested for compliance with the believability property and receives an outcome less than the predefined response rate, detection system 114 can discard the decoy information and not inject the decoy information in the computing environment.

Similarly, detection system 114 can also determine whether simulated user activity complies with a believability property. For example, detection system 114 can perform a Turing test, where portions of simulated user activity and actual user activity are selected. The two pieces of information can be presented to a volunteer or any other suitable user and the volunteer can be tasked to determine which of the two are authentic.

Accordingly, decoy information that complies with one or more of the above-mentioned properties can be used to entice covert malware into believing that it has obtained legitimate credentials and confuse or slow down covert malware. For example, covert malware can be forced to spend time and energy obtaining information and then sorting through the collected information to determine actual information from decoy information. In another example, the decoy information can be modeled to contradict the actual or authentic data on one of systems 100, 200, 300, 400, or 500, thereby confusing the covert malware at attacking computer system 116 or the user of attacking computer system 116 and luring the user of attacking computer system 116 to risk further actions to clear the confusion.

Figure 6:
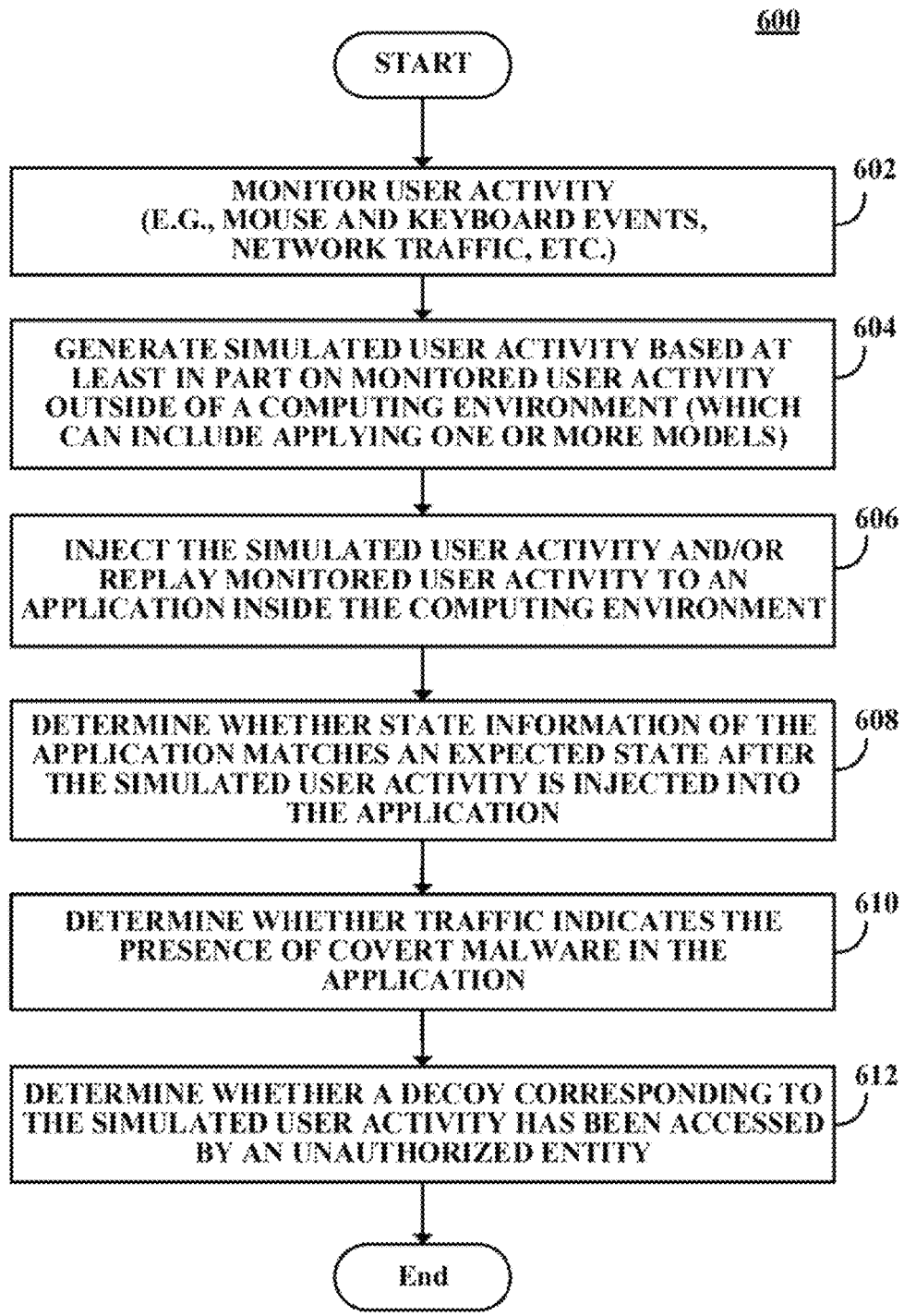
FIG. 6 is a diagram showing an example of a process for detecting covert malware by simulating user activity and verifying its response in a computing environment in accordance with some embodiments of the disclosed subject matter.

As described above, mechanisms for detecting covert malware are provided. FIG. 6 illustrates an example of a process 600 for detecting covert malware in accordance with some embodiment of the disclosed subject matter. As shown, process 600 begins by monitoring user activity at 602. The user activity can include, for example, mouse and keyboard events captured from users (e.g., users at collaborating system 102 of FIG. 1), network traffic, etc. For example, as shown in FIG. 2, simulation and injection component 210 can receive recorded mouse and keyboard events (e.g., X-Window events) captured from users. In another example, as shown in FIG. 4, detection system 114 can monitor traffic and conversation summaries to determine user activity over a network. In yet another example, as shown in FIG. 5, detection system 114 can receive monitored mouse and keyboard actions from users on user computers 520.

Referring back to FIG. 6, simulated user activity can then be generated based on the monitored user activity at 604. For example, as shown in FIG. 2, simulation and injection component (VMSim) 210 can perform a simulation process that records, modifies, and replays mouse and keyboard events based on the monitored user activity.

In some embodiments, a formal language that specifies a sequence of user activity can be used by simulation and injection component (VMSim) 210. The formal language can be used to generate variable simulation behaviors and workflows. An illustrative example of a formal language, such as a VMSim language, is shown in FIG. 7.

It should be noted that the formal language shown in FIG. 7 can be used to differentiate between different types of user activity. For example, as shown, the formal language can define carry actions that result in the simulation and injection of decoys. In another example, the formal language can define cover actions that are recorded and replayed to support the believability of the injection of carry actions or carry traffic. Cover actions can include the opening and editing of a text document (e.g., WordActions) or the opening and closing of particular windows (e.g., SysActions). As also shown in FIG. 7, the formal language can include verification actions (VerifyAction) that allow simulation and injection component (VMSim) 210 to communicate and interact with virtual machine verification component 220. In particular, this provides support for conditional operations, synchronization, and/or error checking. It should also be noted that, using verification actions, simulation and injection component (VMSim) 210 can interact with virtual machine verification component 220 to ensure the accuracy of simulations (and simulated user activity) as particular actions can cause delays.

Referring back to FIG. 6, in generating simulated user activity, recorded mouse and keyboard events of an actual user can be mapped to the constructs of the formal language. In addition, once the simulated user activity is implemented, one or more models can be applied. For example, simulation and injection component (VMSim) 210 of FIG. 2 can be tuned to one or more biometric models for keystroke speed, mouse speed, mouse distance, and the frequency of errors made by a user when typing. These parameters function as controls over the formal language and assist in creating variability in the simulations by simulation and injection component (VMSim) 210. Depending on the particular simulation, other parameters such as uniform resource locators (URLs) or other text that must be typed are then entered to adapt each action. Simulation and injection component (VMSim) 210 translates the formal language's actions (e.g., one or more CarryActions, CoverActions, etc.) into lower level constructs that include keyboard and mouse functions. These can then be outputted, for example, as X protocol level data for replaying using the XText extensions.

In some embodiments, one or more features, such as keycodes (e.g., the ASCII code representing a key), the duration for which a key is pressed, keystroke error rates, mouse movement speed, and mouse movement distance, can be recorded for the construction of one or more user models or biometric models. For example, generative models for keystroke timing can be created by dividing the recorded data for each keycode pair into separate classes, where each class is determined by the distance in standard deviations from the mean. The distribution for each keycode sequence can be calculated as the number of instances of each class. Simulation keystroke timing can be adapted to profiles of individual users by generating random times that are bounded by the class distribution.

Similarly, for mouse movements, user specific profiles for speed and distance can be calculated. Recorded mouse movements can be divided into variable length vectors that represent particular periods of mouse activity. Distributions for each user can be calculated using these vectors. The mouse movement distributions can be used as parameters for tuning the simulated user actions generated by simulation and injection component (VMSim) 210.

It should be noted that, in order to generate tamper resistant simulated user activity and tamper resistant decoy information, the generation of the simulated user activity occurs outside of the host computing environment. For example, in FIG. 2, the location where the simulation process is executed (simulation and injection component 210) and the location where the user actions are received (guest operating system 260) are decoupled. In another example, in FIGS. 4 and 5, detection system 114 also resides outside of the host to be protected. In the thin client-based architecture of FIG. 5, detection system 114 communicates with a central server where the proximity of detection system 114 can be adjusted to reduce network overhead.

Referring back to FIG. 6, the simulated user activity can be injected to an application inside the computing environment at 606. In addition, as described previously, user activity from actual users can be replayed along with the simulated user activity (that includes decoy information) to support the believability of the simulated user activity.

As shown in FIGS. 2-5, the simulated user activity can be injected using any suitable number of approaches. Referring back to FIG. 2, simulation and injection component (VMSim) 210 transmits the simulated user activity into the guest operating system 260. In a more particular example, simulation and injection component 210 obtains access to the display of guest operating system 260 to play back the simulated user activity. During playback, simulation and injection component 210 can automatically detect the position of the virtual machine window and adjust the coordinates to reflect the changes of the simulated user activity. Alternatively, simulation and injection component 210 can transmit the decoy information 250 into a suitable buffer.

In some embodiments, as shown in FIG. 4, the simulated user activity can be injected by simulating Bluetooth input devices. In selecting the Bluetooth protocol, the physical proximity of the workstations to one another within a typical workspace can be leveraged. More particularly, a Bluetooth proxy application can be used to transmit the simulated user activity. The Bluetooth proxy application can receive user activity from GNU Xnee or any other suitable function, modify and translate the user actions to the Bluetooth human interface devices (HID) protocol, and transmit the simulated user activity into a host.

Alternatively or additionally, in the thin client environment of FIG. 5, remote access protocols (e.g., Citrix, VNC, etc.) can be used to inject simulated user activity. Detection system 114 is deployed as a thin client that periodically connects to each hosted virtual machine and injects decoy credentials and/or any other suitable decoy information with simulated user activity.

Referring back to FIG. 6, at 608, process 600 continues by performing a verification that includes determining whether state information of the application matches an expected state after the simulated user activity is injected. Process 600 verifies the success or failure of mouse and keyboard events that are passed to, for example, a guest operating system. For example, in some embodiments, a visual verification can be performed by determining whether the screen output changed in response to simulated user activity (e.g., with respect graphical artifacts or pixel selections).

In a more particular example, FIG. 2 shows that virtual machine verification can be performed using virtual machine verification component 220. Virtual machine verification component 220 can determine whether the current virtual machine state is in one of a predefined set of states. The states can be defined from select regions of the virtual machine graphical output, thereby allowing states to consist of any suitable visual artifact present in a simulation workflow. To support non-deterministic simulations, it should be noted that each transition can end in one of several possible states. It should also be noted that the verification can be formalized over a set of transitions T and set of states S, where each $t_0, t_1, \ldots, t_n \epsilon T$ can result in the set of states $s_{t1}, s_{t2}, \ldots, s_{tn} \subseteq S$. Virtual machine verification component 220 can decide whether a state verified for a current state c, when $c \epsilon s_{ti}$.

It should be noted that, in some embodiments, states can be defined using a pixel selection tool. The pixel selection tool allows simulation and injection component 210 or any other suitable component to select any portion of a guest operating system's screen for use as a state. In particular, the states can be defined for any event that can cause a simulation to delay (e.g., a network login, opening an application, navigating to a web page). In addition, the pixel selection tool allows a user of simulation and injection component 210 to select the size of the screen (state).

Virtual machine verification component 220 can be controlled and/or modified by several parameters, such as the number of pixels in the screen selection, the size of the search area for a selection, the number of possible states to verify at each point of time, the number of pixels required to match for positive verification, etc. In some embodiments, a time or computation estimate for performing such a verification can be provided, where a user can modify the screen selection, number of pixels, or perform any other suitable modification to modify the estimate.

Similarly, in the thin client environment shown in FIG. 5, arbitrary portions of the virtual machine screen can be monitored and/or grabbed and the absolute number of different pixels can be counted.

In some embodiments, instead of monitoring the screen of the hosts under protection, the verification can be conducted by performing a network level verification. In a wireless device-based architecture, such as the one shown in FIG. 4, the verification can be performed by verifying that a connection to an IP address of a sensitive website's web server is established and monitoring for a specific conversation pattern (e.g., based on bytes sent and received).

In some embodiments, process 600 determines whether user activity—e.g., actual user activity, simulated user activity, and/or replayed user activity—is network verifiable. In response to determining that the simulated user activity (including decoy information) is network verifiable, a network monitoring component can be initiated to verify that the output over the network is as expected.

For example, a network monitor, such as network monitor 440 in FIG. 4 or any other suitable monitoring component, monitors and/or collects network traffic. This can include, for example, reporting conversation summaries or data exchanged between a host and a web server for a sensitive website (e.g., a banking website, a web-based email provider website, etc.). Detection system 114 can analyze the network traffic received from network monitor 440. For example, detection system 114 can, from the received network traffic, determine the number of conversations, the number of exchanged request/response messages, and the number of bytes transferred in each message.

In a more particular example, a conversation summary or exchange can be represented as follows:

192.168.0.1 192.168.0.42>70<2728>204<67>762<1260

In the above-mentioned exchange, the first two fields represent the IP addresses of the participators (the host computer and the web server). The subsequent fields represent the aggregated number of bytes transmitted in each direction. For example, at the start, a computing device with an IP address of 192.168.0.1 transmitted 70 bytes to a computing device with an IP address of 192.168.0.42.

Detection system 114 can analyze the conversation summaries to create one or more models. For example, detection system 114 can determine that each login session to an anonymous bank website comprised of only one conversation with ten messages or five request/response pairs. Similarly, in another example, detection system 114 can determine that when a user is successful in logging into a website, such as PayPal, there were several conversations, but there was always one conversation that comprised of eight messages. On the other hand, detection system 114 can observe that failed login attempts to particular websites resulted in different conversations with respect to number of streams, number of messages, number of bytes transmitted in each message, etc. In a more particular example, detection system 114 can observe that failed login attempts to the PayPal website resulted in more conversations, where none of them comprised eight messages.

Accordingly, detection system 114, upon analyzing the received network traffic, can perform a conversation match, where the number of conversations, the number of messages exchanged, and the number of bytes in each message can be used to verify the simulated user activity.

Referring back to FIG. 6, process 600 continues by determining whether traffic indicates the presence of covert malware in the application at 610 and determining whether a decoy corresponding to the simulated user activity has been accessed by an unauthorized entity. The detection system determines whether it deceptively induced or enticed covert malware into an observable action during the exploitation of monitored information injected into the computing environment. In a more particular example, the existence of credential stealing malware can be monitored and detected by impersonating a user login to a sensitive website using decoy credentials and detecting whether this specific account was accessed by anyone else except for the system. This provides clear and concrete evidence that the credentials were stolen and that an entity other than the system attempted to check the validity and/or value of that account.

For example, in response to determining that the current state does not match an expected state—e.g., the current graphical output does not match the expected graphical output, the absolute number of pixels in a portion of the graphical output does not match the expected number of pixels, or the current conversation or conversations do not match with the expected conversation (request/response pairs)—the detection system monitors network traffic using a network monitor to determine whether covert malware attempts an exfiltration. For example, network monitoring component 230 of FIG. 2 or any other network monitoring component can record traffic and generate an alert when malicious traffic originates from the host computing environment. In a more particular example, FIG. 8 shows an example of network traffic elicited from a Sinowal Trojan. This shows the covert malware exfiltrating the actual decoy credentials in unencrypted network traffic. In another suitable example, FIG. 9 shows an illustrative example for virtual machines in a thin client environment, where outbound HTTP POST messages were transmitted to websites other than those provided for navigation to while injecting IP addresses. The IP addresses that communicate with covert malware are shown in the left column and the script names that exfiltrated data are shown in the right column.

It should be noted that, in some embodiments, to identify the malicious traffic, a whitelist of known and allowed traffic, which can be constructed as part of the simulated user activity, can be used to differentiate or distinguish known and allowed traffic from malicious traffic.

In addition, as described previously, decoy information that includes bogus credentials can be detectable outside of a host by one or more external monitors. For example, a bogus login to a website can be created and monitored by external approaches (e.g., polling a website or using a custom script that accesses mail.google.com and parses the bait account pages to gather account activity information). In another example, bait information including online banking logins provided by a collaborating financial institution, login accounts provided by collaborating online servers, and/or web-based email accounts provided by collaborating email providers can be used as decoy information.

More particularly, a network monitor or any other suitable external monitor can log into a decoy account at predetermined times (e.g., every hour) to check the last recorded login. If the delta between the times is greater than a given amount (e.g., 75 seconds), the external monitor triggers an alert for the account and transmits an email notification. For example, a PayPal external monitor can determine the time differences recorded by the detection system and the PayPal service for a user's last login.

In some embodiments, the external monitor can be configured to accommodate for different polling frequencies. For example, based on the type of traffic information (e.g., only last login time), the external monitor can be configured to poll the service more frequently.

In some embodiments, the detection system can transmit a notification, such as an email notification, to an administrator user that indicates covert malware may be present. The notification can include information relating to the attacker, such as the IP address, the exfiltrated decoy information, and the time that the attacker conducted the malicious action. The notification can also include count information relating to the number of times the particular decoy information has been accessed, executed, etc.

Accordingly, methods, systems, and media for detecting covert malware are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims which follow. Features of the disclosed embodiments can be combined and rearranged in various ways.

What is claimed is:

1. A method for detecting covert malware in a computing environment, the method comprising:
   receiving, using a hardware processor, a first set of user actions;
   automatically generating, without receiving user input, using the hardware processor, a second set of user actions that is similar to the first set of user actions based on the first set of user actions and using a model of user activity, wherein the first set of user actions is modified using the model of user activity to generate the second set of user actions in the form of simulated user actions;
   replaying, using the hardware processor, the second set of user actions to an application inside the computing environment;
   determining, using the hardware processor, whether state information of the application matches an expected state in response to the second set of user actions is being replayed to the application inside the computing environment;
   determining, using the hardware processor, whether covert malware is present in the computing environment based at least in part on the determination of whether the state information matches the expected state; and
   transmitting, using the hardware processor, an alert to a computing device in response to determining that covert malware is present in the computing environment.

2. The method of claim 1, wherein the second set of user actions is generated outside of the computing environment.

3. The method of claim 1, further comprises:
   determining whether a decoy corresponding to the second set of user actions has been accessed by an unauthorized entity; and
   in response to determining that the decoy has been accessed by the unauthorized entity, determining that covert malware is present in the computing environment.

4. The method of claim 1, wherein the first set of user actions comprises mouse and keyboard events.

5. The method of claim 4, further comprising replaying at least a portion of the first set of user actions along with conveying the second set of user actions.

6. The method of claim 4, wherein generating the second set of user actions further comprises recording, modifying, and replaying the mouse and keyboard events based on the first set of user actions.

7. The method of claim 1, wherein the second set of user actions is generated by modifying the first set of user actions and translating the first set of user actions using a wireless protocol.

8. The method of claim 1, further comprising defining the second set of user actions by a formal language, wherein the first set of user actions is mapped to constructs of the formal language and wherein the formal language comprises carry actions for the simulation and the conveyance of the decoy and cover actions that support believability of the second set of user actions and the decoy.

9. The method of claim 1, wherein the model of user activity includes a model of at least one of: keystroke speed, mouse speed, mouse distance, keystroke error rate, and frequency of errors made during typing.

10. The method of claim 1, wherein determining the state information further comprises performing a visual verification that determines whether a screen output changed as expected in response to the second set of user actions.

11. The method of claim 1, wherein determining the state information further comprises:
analyzing network traffic to determine message characteristics that include at least one of: a number of conversations, a number of messages exchanged, and a number of bytes in each message; and
comparing the state information that includes current message characteristics with the analyzed network traffic that includes determined message characteristics.

12. A system for detecting covert malware in a computing environment, the system comprising:
a hardware processor that is configured to:
receive a first set of user actions;
automatically generate, without receiving user input, a second set of user actions that is similar to the first set of user actions based on the first set of user actions and using a model of user activity, wherein the first set of user actions is modified using the model of user activity to generate the second set of user actions in the form of simulated user actions;
replay the second set of user actions to an application inside the computing environment;
determine whether state information of the application matches an expected state in response to the second set of user actions is being replayed to the application inside the computing environment;
determine whether covert malware is present in the computing environment based at least in part on the determination of whether the state information matches the expected state; and
transmit an alert to a computing device in response to determining that covert malware is present in the computing environment.

13. The system of claim 12, wherein the second set of user actions is generated outside of the computing environment.

14. The system of claim 12, wherein the hardware processor is further configured to:
determine whether a decoy corresponding to the second set of user actions has been accessed by an unauthorized entity, and
in response to determining that the decoy has been accessed by the unauthorized entity, determine that covert malware is present in the computing environment.

15. The system of claim 12, wherein the first set of user actions comprises mouse and keyboard events.

16. The system of claim 15, wherein the hardware processor is further configured to replay at least a portion of the first set of user actions along with conveying the second set of user actions.

17. The system of claim 15, wherein the hardware processor is further configured to record, modify, and replay the mouse and keyboard events based on the first set of user actions.

18. The system of claim 12, wherein the second set of user actions is generated by modifying the first set of user actions and translating the first set of user actions using a wireless protocol.

19. The system of claim 12, wherein the hardware processor is further configured to define the second set of user actions by a formal language, wherein the first set of user actions is mapped to constructs of the formal language and wherein the formal language comprises carry actions for the simulation and the conveyance of the decoy and cover actions that support believability of the second set of user actions and the decoy.

20. The system of claim 12, wherein the model of user activity includes a model of at least one of: keystroke speed, mouse speed, mouse distance, keystroke error rate, and frequency of errors made during typing.

21. The system of claim 12, wherein the hardware processor is further configured to perform a visual verification that determines whether a screen output changed as expected in response to the second set of user actions.

22. The system of claim 13, wherein the hardware processor is further configured to:
analyze network traffic to determine message characteristics that include at least one of: a number of conversations, a number of messages exchanged, and a number of bytes in each message; and
compare the state information that includes current message characteristics with the analyzed network traffic that includes determined message characteristics.

23. A non-transitory computer-readable medium containing computer-executable instructions that, when executed by a processor, cause the processor to perform a method for detecting covert malware in a computing environment, the method comprising:
receiving a first set of user actions;
automatically generating, without receiving user input, a second set of user actions that is similar to the first set of user actions based on the first set of user actions and using a model of user activity, wherein the first set of user actions is modified using the model of user activity to generate the second set of user actions in the form of simulated user actions;
replaying the second set of user actions to an application inside the computing environment;
determining whether state information of the application matches an expected state in response to the second set of user actions is being replayed to the application inside the computing environment;
determining whether covert malware is present in the computing environment based at least in part on the determination of whether the state information matches the expected state; and
transmitting an alert to a computing device in response to determining that covert malware is present in the computing environment.

* * * * *